(12) United States Patent
Hori et al.

(10) Patent No.: US 11,140,726 B2
(45) Date of Patent: Oct. 5, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 63 days.

(21) Appl. No.: 16/620,925

(22) PCT Filed: Jun. 15, 2018

(86) PCT No.: PCT/JP2018/023017
§ 371 (c)(1),
(2) Date: Dec. 10, 2019

(87) PCT Pub. No.: WO2018/230728
PCT Pub. Date: Dec. 20, 2018

(65) Prior Publication Data
US 2020/0163130 A1 May 21, 2020

(30) Foreign Application Priority Data
Jun. 15, 2017 (JP) .............................. JP2017-117492

(51) Int. Cl.
*H04W 76/10* (2018.01)
*H04W 72/04* (2009.01)
*H04W 76/27* (2018.01)

(52) U.S. Cl.
CPC ........... *H04W 76/10* (2018.02); *H04W 72/04* (2013.01); *H04W 76/27* (2018.02)

(58) Field of Classification Search
CPC ..... H04W 28/06; H04W 76/12; H04W 76/27; H04W 76/15; H04W 72/04; H04W 76/10; H04W 88/06; H04W 16/32
See application file for complete search history.

(56) References Cited

U.S. PATENT DOCUMENTS

2019/0349822 A1* 11/2019 Kim ...................... H04W 76/10
2020/0008255 A1* 1/2020 Sharma ............... H04W 12/041
(Continued)

FOREIGN PATENT DOCUMENTS

EP  3 297 388 A1  3/2018

OTHER PUBLICATIONS

NTT DOCOMO, INC., "Improvement on capturing bearer (re)configuration procedures for LTE-NR Dual Connectivity", 3GPP TSG-RAN WG2 #98, R2-1704315, May 15-19, 2017, pp. 1-4.
(Continued)

Primary Examiner — Brian D Nguyen
(74) Attorney, Agent, or Firm — Keating & Bennett, LLP

(57) ABSTRACT

A terminal apparatus for communicating with a base station apparatus receives an RRC connection reconfiguration request message including a Data Radio Bearer (DRB) configuration from the base station apparatus. The DRB configuration includes a DRB identity and an SDAP entity configuration corresponding to the DRB identity. The SDAP entity configuration includes an SDAP header length. An SDAP entity is established in accordance with SDAP configuration information in which the SDAP header length is one or more of integer values of a multiple of eight including zero.

8 Claims, 18 Drawing Sheets

(56) References Cited

U.S. PATENT DOCUMENTS

| | | | |
|---|---|---|---|
| 2020/0077308 A1* | 3/2020 | Kim | H04W 36/0055 |
| 2020/0120569 A1 | 4/2020 | Baek et al. | |
| 2021/0058426 A1* | 2/2021 | Basu Mallick | H04L 63/06 |
| 2021/0058995 A1* | 2/2021 | Sharma | H04W 76/20 |
| 2021/0076235 A1* | 3/2021 | Martin | H04W 36/0085 |
| 2021/0084705 A1* | 3/2021 | Wang | H04W 76/11 |
| 2021/0092597 A1* | 3/2021 | Sharma | H04W 12/06 |

OTHER PUBLICATIONS

NTT DOCOMO, INC., "Further analysis of unified split bearer—NW aspects", 3GPP TSG-RAN WG2 #98, R2-1704152, May 15-19, 2017, pp. 1-5.

Official Communication issued in International Patent Application No. PCT/JP2018/023017, dated Jul. 31, 2018.

Ericsson, "On the different bearer options", 3GPP TSG-RAN WG2 #98, Tdoc R2-1704414, May 15-19, 2017, pp. 1-3.

"LTE; General Packet Radio Service (GPRS) enhancements for Evolved Universal Terrestrial Radio Access Network (E-UTRAN) access (3GPP TS 23.401 version 14.3.0 Release 14)", ETSI TS 123 401 V14.3.0, May 2017, 393 pages.

"3rd Generation Partnership Project; Technical Specification Group Radio Access Network; NR; Medium Access control (MAC) protocol specification (Release 15)", 3GPP TS 38.321 V0.0.3, May 2017, pp. 1-20.

"3rd Generation Partnership Project; Technical Specification Group Radio Access Network; NR; Radio Link Control (RLC) protocol specification (Release 15)", 3GPP TS 38.322 V0.0.2, May 2017, pp. 1-18.

"3rd Generation Partnership Project; Technical Specification Group Radio Access Network; NR; Packet Data Convergence Protocol (PDCP) specification (Release 15)", 3GPP TS 38.323 V0.0.5, May 2017, pp. 1-24.

"3rd Generation Partnership Project; Technical Specification Group Radio Access Network; NR; Radio Resource Control (RRC); Protocol specification (Release 15 )", 3GPP TS 38.331 V0.0.3, May 2017, pp. 1-20.

"3rd Generation Partnership Project; Technical Specification Group Radio Access Network; NR; NR and NG-RAN Overall Description; Stage 2 (Release 15)", 3GPP TS 38.300 V0.4.1, Jun. 2017, pp. 1-54.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.1.1, Jun. 2017, pp. 1-31.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, pp. 1-106.

"3rd Generation Partnership Project; Technical Specification Group Radio Access Network; Evolved Universal Terrestrial Radio Access (E-UTRA); Radio Link Control (RLC) protocol specification (Release 14)", 3GPP TS 36.322 V14.0.0, Mar. 2017, pp. 1-45.

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.2.0, Mar. 2017, pp. 1-43.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, pp. 1-721.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.2.0, Mar. 2017, pp. 1-330.

"3rd Generation Partnership Project; Technical Specification Group Services and System Aspects; System Architecture for the 5G System; Stage 2 (Release 15)", 3GPP TS 23.501 V1.0.0, Jun. 2017, pp. 1-145.

NTT DOCOMO, INC., "New WID on New Radio Access Technology", 3GPP TSG RAN Meeting #75, RP-170855, Mar. 6-9, 2017, 14 pages.

"Signalling radio bearer: SRB1", 3GPP TS 36.331 V14.2.2 Release 14, Apr. 2017, 12 pages.

NTT DOCOMO, INC., "MCG/SCG configuration for LTE-NR Dual Connectivity", 3GPP TSG-RAN WG2 #98, R2-1704192, May 15-19, 2017, pp. 1-8.

* cited by examiner

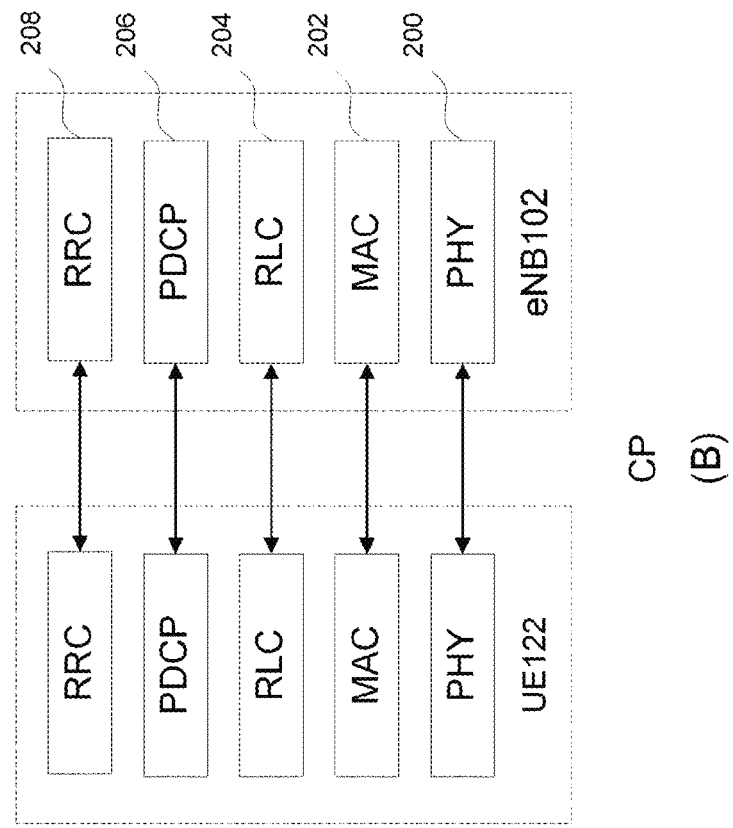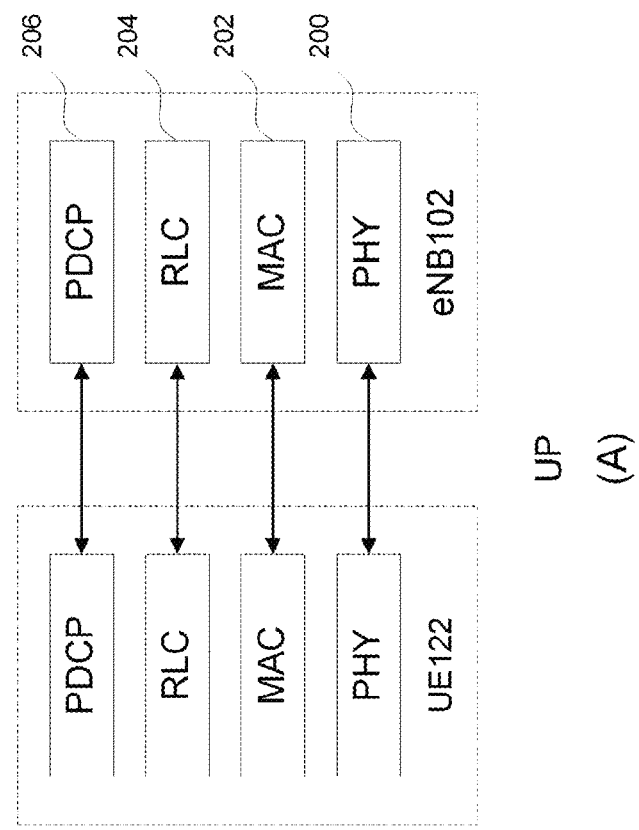
FIG. 2

```
<OMITTED>
RRCConnectionReconfiguration ::= SEQUENCE {
    rrc-TransactionIdentifier    RRC-TransactionIdentifier,
    criticalExtensions           CHOICE {
        c1                       CHOICE{
            rrcConnectionReconfiguration-Nr    RRCConnectionReconfiguration-NR-IEs,
            <PARTLY OMITTED>
        },
        <PARTLY OMITTED>
    <PARTLY OMITTED>
RRCConnectionReconfiguration-NR-IEs ::= SEQUENCE {
    radioResourceConfigDedicated    RadioResourceConfigDedicated    OPTIONAL,
    <PARTLY OMITTED>
}
<PARTLY OMITTED>
RadioResourceConfigDedicated ::=    SEQUENCE {
    <PARTLY OMITTED>
    drb-ToAddModList                DRB-ToAddModList                OPTIONAL
    <PARTLY OMITTED>
    OPTIONAL,
}
<PARTLY OMITTED>
DRB-ToAddModList ::=    SEQUENCE (SIZE (1..maxDRB)) OF DRB-ToAddMod
<PARTLY OMITTED>
```

FIG. 7

```
DRB-ToAddMod ::=   SEQUENCE {
    <PARTLY OMITTED>
    drb-Identity                    DRB-Identity,
    pdcp-Config                         PDCP-Config         OPTIONAL,
    rlc-Config                          RLC-Config          OPTIONAL,
    logicalChannelIdentity          INTEGER (3..10)          OPTIONAL,
    logicalChannelConfig            LogicalChannelConfig OPTIONAL,
    <PARTLY OMITTED>
}
    <PARTLY OMITTED>
PDCP-Config ::= CHOICE {
    <PARTLY OMITTED>
    pdcp-Eutra-Config                PDCP-EUTRA-Config,
    pdcp-Nr-Config                   PDCP-EUTRA-Config,
    <PARTLY OMITTED>
}
    <PARTLY OMITTED>
EUTRA-PDCP-Config::=            SEQUENCE {
    <PARTLY OMITTED>
    pdcp-SN-Size                    ENUMERATED {len7bits, len12bits}
    <PARTLY OMITTED>
}
NR-PDCP-Config::=
    <PARTLY OMITTED>           SEQUENCE {
    pdcp-SN-Size                    ENUMERATED {len7bits, len12bits, len18bits}
    <PARTLY OMITTED>
}
    <OMITTED>
```

FIG. 8

```
<OMITTED>
DRB-ToAddModADDCG-NR ::=    SEQUENCE {
    drb-Identity-NR             DRB-Identity,
    drb-Type-NR                 CHOICE {
        split-NR                    NULL,
<PARTLY OMITTED>

<OMITTED>
}
```

FIG. 12

```
<OMITTED>
DRB-ToAddMod ::=   SEQUENCE {
    <PARTLY OMITTED>
    drb-Identity              DRB-Identity,
    sdap-Config                   SDAP-Config                          OPTIONAL,
    pdcp-Config                   PDCP-Config                          OPTIONAL,
    rlc-Config                    RLC-Config                           OPTIONAL,
    logicalChannelIdentity    INTEGER (3..10)                 OPTIONAL,
    logicalChannelConfig      LogicalChannelConfig OPTIONAL,
    <PARTLY OMITTED>
}

<PARTLY OMITTED>
SDAP-Config ::=   SEQUENCE {
    <PARTLY OMITTED>
    sdap-SN-Size              ENUMERATED {len0bits, len8bits, len16bits, len24bits},
    <PARTLY OMITTED>
}
<OMITTED>
```

FIG. 14

```
<OMITTED>
DRB-ToAddMod ::=   SEQUENCE {
    <PARTLY OMITTED>
    drb-Identity           DRB-Identity,
    sdap-Config                SDAP-Config      OPTIONAL,
    pdcp-Config                PDCP-Config      OPTIONAL,
    rlc-Config                 RLC-Config       OPTIONAL,
    logicalChannelIdentity INTEGER (3..10)       OPTIONAL,
    logicalChannelConfig   LogicalChannelConfig OPTIONAL,
    <PARTLY OMITTED>

<PARTLY OMITTED>
PDCP-Config ::=   SEQUENCE {
    <PARTLY OMITTED>
    sdap-SN-Size           ENUMERATED {len0bits, len8bits, len16bits, len24bits},
    <PARTLY OMITTED>

<OMITTED>
```

FIG. 15

```
<OMITTED>
RRCConnectionResconfiguration ::=   SEQUENCE {
    rrc-TransactionIdentifier          RRC-TransactionIdentifier,
    criticalExtensions                 CHOICE {
        c1                             CHOICE{
            rrcConnectionReconfiguration-Eutra    RRCConnectionReconfiguration-EUTRA-IEs,
            rrcConnectionReconfiguration-Nr       RRCConnectionReconfiguration-NR-IEs,
            <PARTLY OMITTED>
        }
        <PARTLY OMITTED>
    }
    <PARTLY OMITTED>
}

RRCConnectionReconfiguration-EUTRA-IEs ::= SEQUENCE {
    <PARTLY OMITTED>
    radioResourceConfigDedicated-Eutra        RadioResourceConfigDedicated-EUTRA    OPTIONAL,
    <PARTLY OMITTED>
}

RRCConnectionReconfiguration-NR-IEs ::= SEQUENCE {
    <PARTLY OMITTED>
    radioResourceConfigDedicated-Nr           RadioResourceConfigDedicated-NR       OPTIONAL,
    <PARTLY OMITTED>
}

RadioResourceConfigDedicated-EUTRA ::=    SEQUENCE {
    <PARTLY OMITTED>
    drb-ToAddModList-Eutra                    DRB-ToAddModList-EUTRA                OPTIONAL,
    <PARTLY OMITTED>
    OPTIONAL,
    <PARTLY OMITTED>
}
```

FIG. 16

```
<PARTLY OMITTED>
RadioResourceConfigDedicated-NR ::=    SEQUENCE {
    <PARTLY OMITTED>
    drb-ToAddModList-Nr                DRB-ToAddModList-NR                              OPTIONAL
        <PARTLY OMITTED>
        OPTIONAL,
    <PARTLY OMITTED>
}

<PARTLY OMITTED>
DRB-ToAddModList-EUTRA ::=    SEQUENCE (SIZE (1..maxDRB)) OF DRB-ToAddMod-EUTRA
    <PARTLY OMITTED>
DRB-ToAddModList-NR ::=       SEQUENCE (SIZE (1..maxDRB)) OF DRB-ToAddMod-NR
    <PARTLY OMITTED>
DRB-ToAddMod-EUTRA ::=   SEQUENCE {
    <PARTLY OMITTED>
    drb-Identity             DRB-Identity,
    pdcp-Config-Eutra        PDCP-Config-EUTRA                   OPTIONAL
    rlc-Config-Eutra         RLC-Config-EUTRA                    OPTIONAL
    logicalChannelIdentity   INTEGER (3..10)                                OPTIONAL
    logicalChannelConfig-Eutra  LogicalChannelConfig-EUTRA      OPTIONAL
    <PARTLY OMITTED>
}

DRB-ToAddMod-NR ::=      SEQUENCE {
    <PARTLY OMITTED>
    drb-Identity             DRB-Identity,
    pdcp-Config-Nr           PDCP-Config-NR                      OPTIONAL
    rlc-Config-Nr            RLC-Config-NR                                  OPTIONAL
    logicalChannelIdentity   INTEGER (3..10)                     OPTIONAL
    logicalChannelConfig-Nr  LogicalChannelConfig-NR             OPTIONAL
    <PARTLY OMITTED>
}
```

FIG. 17

```
<PARTLY OMITTED>
PDCP-Config-EUTRA ::= CHOICE {
    <PARTLY OMITTED>
    pdcp-Eutra-Config          PDCP-EUTRA-Config,
    pDcp-Nr-Config             PDCP-NR-Config,
    <PARTLY OMITTED>
}

<PARTLY OMITTED>
PDCP-Config-NR ::= CHOICE {
    <PARTLY OMITTED>
    pdcp-Eutra-Config          PDCP-EUTRA-Config,
    pDcp-Nr-Config             PDCP-NR-Config,
    <PARTLY OMITTED>
}

<PARTLY OMITTED>
PDCP-EUTRA-Config::=           SEQUENCE {
    <PARTLY OMITTED>
    pdcp-SN-Size               ENUMERATED {len7bits, len12bits}
    <PARTLY OMITTED>
}

<PARTLY OMITTED>
PDCP-NR-Config::=              SEQUENCE {
    <PARTLY OMITTED>
    pdcp-SN-Size               ENUMERATED {len7bits, len12bits, len18bits}
    <PARTLY OMITTED>
}

<OMITTED>
```

FIG. 18

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

BACKGROUND ART

A radio access method and a radio network (hereinafter, referred to as "Long Term Evolution (LTE: Registered Trademark)" or "Evolved Universal Terrestrial Radio Access (EUTRA)"), and a core network (hereinafter, "Evolved Packet Core (EPC)") for cellular mobile communications have been studied in the 3rd Generation Partnership Project (3GPP).

Furthermore, as a radio access method and a radio access network technology for a fifth-generation cellular system, a technical study and standardization of LTE-Advanced Pro which is an enhanced technology of the LTE, and New Radio Technology (NR) which is a new radio access technology have been conducted by the 3GPP (NPL 1). Additionally 5 Generation Core Network (5GC), which is a core network for a fifth generation cellular system, has also been studied (NPL 2).

CITATION LIST

Non Patent Literature

NPL 1: 3GPP RP-170855, "Work Item on New Radio (NR) Access Technology"

NPL 2: 3GPP TS 23.501, "System Architecture for the 5G System; Stage 2"

NPL 3: 3GPP TS 36.300, "Evolved Universal Terrestrial Radio Access (E-UTRA) and Evolved Universal Terrestrial Radio Access Network (E-UTRAN); Overall description; Stage 2"

NPL 4: 3GPP TS 36.331, "Evolved Universal Terrestrial Radio Access (E-UTRA); Radio Resource Control (RRC); Protocol specifications"

NPL 5: 3GPP TS 36.323, "Evolved Universal Terrestrial Radio Access (E-UTRA); Packet Data Convergence Protocol (PDCP) specification"

NPL 6: 3GPP TS 36.322, "Evolved Universal Terrestrial Radio Access (E-UTRA); Radio Link Control (RLC) protocol specification"

NPL 7: 3GPP TS 36.321, "Evolved Universal Terrestrial Radio Access (E-UTRA); Medium Access Control (MAC) protocol specification"

NPL 8: 3GPP TS 37.340, "Evolved Universal Terrestrial Radio Access (E-UTRA) and NR; Multi-Connectivity; Stage 2"

NPL 9: 3GPP TS 38.300, "NR; NR and NG-RAN Overall description; Stage 2"

NPL 10: 3GPP TS 38.331, "NR; Radio Resource Control (RRC); Protocol specifications"

NPL 11: 3GPP TS 38.323, "NR; Packet Data Convergence Protocol (PDCP) specification"

NPL 12: 3GPP TS 38.322, "NR; Radio Link Control (RLC) protocol specification"

NPL 13: 3GPP TS 38.321, "NR; Medium Access Control (MAC) protocol specification"

NPL 14: 3GPP TS 23.401 v14.3.0, "General Packet Radio Service (GPRS) enhancements for Evolved Universal Terrestrial Radio Access Network (E-UTRAN) access"

SUMMARY OF INVENTION

Technical Problem

As one technical study on NR, a system called Multi-RAT Dual Connectivity (MR-DC) has been studied that allows cells of Radio Access Technologies (RATs) of both E-UTRA and NR to be grouped for each RAT and to be allocated for a UE such that a terminal apparatus communicates with one or more base station apparatuses (NPL 8).

However, since the formats and functions of the communication protocols used in E-UTRA and NR differ, there is a problem in that protocol processing becomes complicated compared to Dual Connectivity in conventional LTE using only E-UTRA as a RAT, and thus a base station apparatus and a terminal apparatus are not able to efficiently communicate with each other.

In view of the circumstances described above, an object of an aspect of the present invention is to provide a terminal apparatus capable of efficiently communicating with a base station apparatus, a base station apparatus communicating with the terminal apparatus, a communication method used for the terminal apparatus, a communication method used for the base station apparatus, an integrated circuit mounted on the terminal apparatus, and an integrated circuit mounted on the base station apparatus.

Solution to Problem

In order to accomplish the object described above, an aspect of the present invention is contrived to provide the following measures. That is, an aspect of the present invention is a terminal apparatus that supports EN-DC. The terminal apparatus includes a receiver configured to receive an RRC connection reconfiguration message from a base station apparatus. The RRC connection reconfiguration message includes a radio bearer identity. The terminal apparatus further includes a configuration unit configured to establish a PDCP entity in accordance with a PDCP entity configuration for NR in a case that the terminal apparatus has not configured a value of the radio bearer identity and in a case that the RRC connection reconfiguration message includes the PDCP entity configuration for NR.

Additionally, an aspect of the present invention is a terminal apparatus that supports EN-DC. The terminal apparatus includes a receiver configured to receive an RRC connection reconfiguration message from a base station apparatus. The RRC connection reconfiguration message includes a radio bearer identity and a PDCP entity configuration corresponding to the radio bearer identity. The PDCP entity configuration is either the PDCP entity configuration for E-UTRA or the PDCP entity configuration for NR. The terminal apparatus further includes a configuration unit configured to establish a PDCP entity in accordance with the PDCP entity configuration for NR in a case that the terminal apparatus has not configured a value of the radio bearer identity and in a case that the RRC connection reconfiguration message does not include the PDCP entity configuration for E-UTRA.

Additionally, an aspect of the present invention is a base station apparatus that supports EN-DC. The base station apparatus includes a generation unit configured to generate an RRC connection reconfiguration message and a transmitter configured to transmit the RRC connection reconfiguration message to a terminal apparatus. The RRC connection reconfiguration message includes a radio bearer identity. The RRC connection reconfiguration message including the radio bearer identity causes the terminal apparatus to establish a PDCP entity in accordance with a PDCP entity configuration for NR in a case that the terminal apparatus has not configured a value of the radio bearer identity and in a case that the RRC connection reconfiguration message includes the PDCP entity configuration for NR.

Additionally, an aspect of the present invention is a base station apparatus that supports EN-DC. The base station apparatus includes a generation unit configured to generate an RRC connection reconfiguration message and a transmitter configured to transmit the RRC connection reconfiguration message to a terminal apparatus. The RRC connection reconfiguration message includes a radio bearer identity and a PDCP entity configuration corresponding to the radio bearer identity. The PDCP entity configuration is selected from the PDCP entity configuration for E-UTRA and the PDCP entity configuration for NR. The RRC connection reconfiguration message including the radio bearer identity and the PDCP entity configuration causes the terminal apparatus to establish a PDCP entity in accordance with the PDCP entity configuration for NR in a case that the terminal apparatus has not configured a value of the radio bearer identity and in a case that the RRC connection reconfiguration message does not include the PDCP entity configuration for E-UTRA.

Additionally, an aspect of the present invention is a method performed by a terminal apparatus that supports EN-DC, the method including the step of receiving an RRC connection reconfiguration message from a base station apparatus. The RRC connection reconfiguration message includes a radio bearer identity. A PDCP entity is established in accordance with a PDCP entity configuration for NR in a case that the terminal apparatus has not configured a value of the radio bearer identity and in a case that the RRC connection reconfiguration message includes the PDCP entity configuration for NR.

Additionally, an aspect of the present invention is a method performed by a terminal apparatus that supports EN-DC. The method includes the step of receiving an RRC connection reconfiguration message from a base station apparatus. The RRC connection reconfiguration message includes a radio bearer identity and a PDCP entity configuration corresponding to the radio bearer identity. The PDCP entity configuration is either the PDCP entity configuration for E-UTRA or the PDCP entity configuration for NR. A PDCP entity is established in accordance with the PDCP entity configuration for NR in a case that the terminal apparatus has not configured a value of the radio bearer identity and in a case that the RRC connection reconfiguration message does not include the PDCP entity configuration for E-UTRA.

Additionally, an aspect of the present invention is a method performed by a base station apparatus that supports EN-DC. The method includes the steps of: generating an RRC connection reconfiguration message; and transmitting the RRC connection reconfiguration message to a terminal apparatus. The RRC connection reconfiguration message includes a radio bearer identity. The RRC connection reconfiguration message including the radio bearer identity causes the terminal apparatus to establish a PDCP entity in accordance with a PDCP entity configuration for NR in a case that the terminal apparatus has not configured a value of the radio bearer identity and in a case that the RRC connection reconfiguration message includes the PDCP entity configuration for NR.

Additionally, an aspect of the present invention is a method performed by a base station apparatus that supports EN-DC. The method includes the steps of: generating an RRC connection reconfiguration message; and transmitting the RRC connection reconfiguration message to a terminal apparatus. The RRC connection reconfiguration message includes a radio bearer identity and a PDCP entity configuration corresponding to the radio bearer identity. The PDCP entity configuration is selected from the PDCP entity configuration for E-UTRA and the PDCP entity configuration for NR. The RRC connection reconfiguration message including the radio bearer identity and the PDCP entity configuration causes the terminal apparatus to establish a PDCP entity in accordance with the PDCP entity configuration for NR in a case that the terminal apparatus has not configured a value of the radio bearer identity and in a case that the RRC connection reconfiguration message does not include the PDCP entity configuration for E-UTRA.

Advantageous Effects of Invention

According to an aspect of the present invention, the terminal apparatus and the base station apparatus can lower complexity of protocol processing and communicate efficiently.

BRIEF DESCRIPTION OF DRAWINGS

FIG. 2 is a protocol stack diagram of a UP and a CP of a terminal apparatus and a base station apparatus in E-UTRA according to each embodiment of the present invention.

FIG. 7 is a part (first page) of a diagram illustrating an example of Abstract Syntax Notation One (ASN.1) for a DRB configuration according to each embodiment of the present invention.

FIG. 8 is another part (second page) of the diagram illustrating the example of Abstract Syntax Notation One (ASN.1) for the DRB configuration according to each embodiment of the present invention.

FIG. 12 is a diagram illustrating an example of Abstract Syntax Notation One (ASN.1) for the DRB configuration of an additional cell group in a case that a CG bearer or an SCG bearer is changed to a split bearer according to Embodiment 2 of the present invention.

FIG. 14 is a diagram illustrating an example of Abstract Syntax Notation One (ASN.1) for the DRB configuration including SDAP information according to Embodiment 3 of the present invention.

FIG. 15 is a diagram illustrating an example of Abstract Syntax Notation One (ASN.1) for the DRB configuration including the SDAP information according to Embodiment 3 of the present invention.

FIG. 16 is a part (first page) of a diagram illustrating an example of Abstract Syntax Notation One (ASN.1) for the DRB configuration according to each embodiment of the present invention.

FIG. 17 is another part (second page) of the diagram illustrating the example of Abstract Syntax Notation One (ASN.1) for the DRB configuration according to each embodiment of the present invention.

FIG. 18 is yet another part (third page) of the diagram illustrating the example of the Abstract Syntax Notation One (ASN.1) for the DRB configuration according to each embodiment of the present invention.

DESCRIPTION OF EMBODIMENTS

Embodiments of the present invention will be described below in detail with reference to the drawings.

LTE (and LTE-A Pro) and NR may be defined as different RATs. The NR may be defined as a technology included in the LTE. The LTE may be defined as a technology included in the NR. Also, the LTE capable of connecting with the NR through dual connectivity may be distinguished from conventional LTE. The present embodiment may be applied to the NR, the LTE and other RATs. Terms associated with the LTE and the NR are used in the following description. However, the present invention may be applied to other technologies using other terms.

Figure 1:
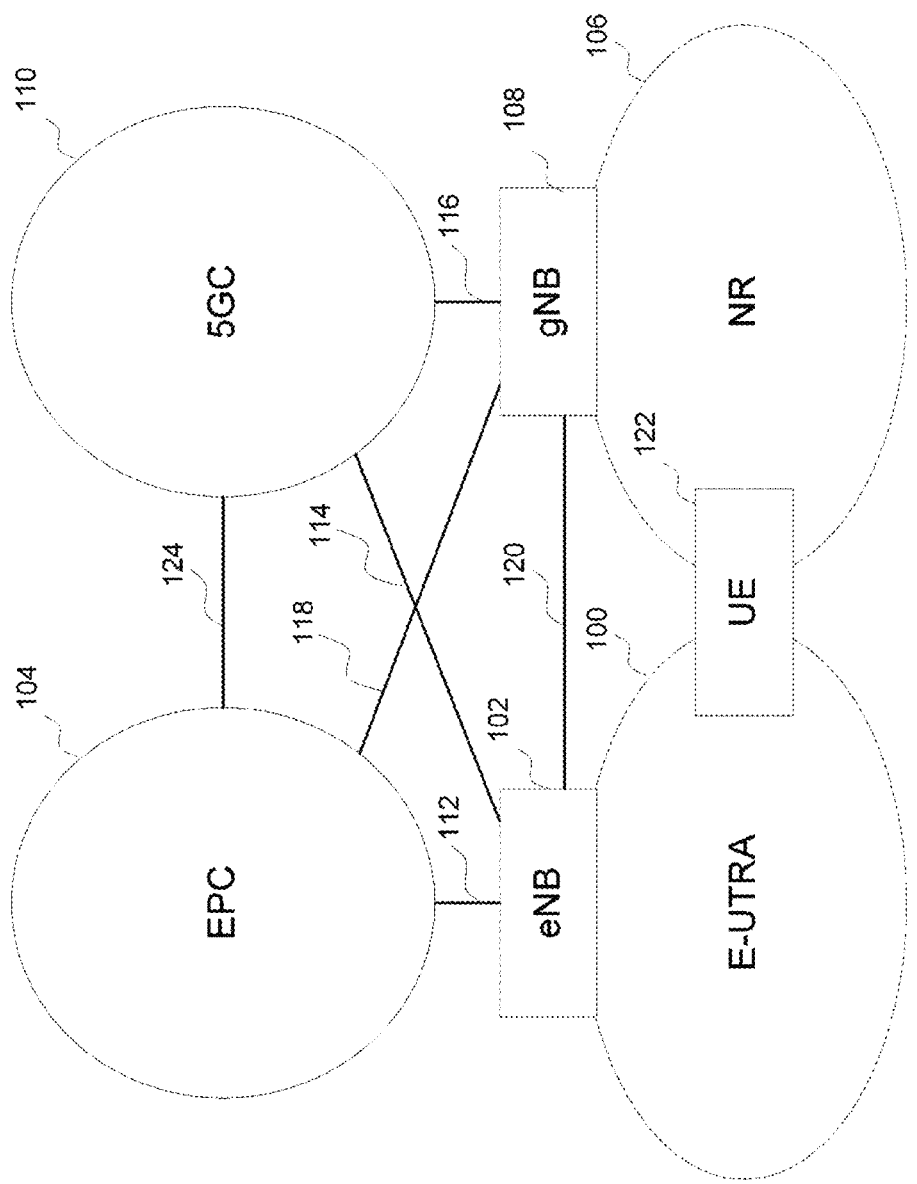
FIG. 1 is a schematic diagram of a communication system according to each embodiment of the present invention.

FIG. 1 is a schematic diagram of a communication system according to each embodiment of the present embodiment.

An E-UTRA 100 is a radio access technology described in NPL 3 or the like, and includes a Cell Group (CG) configured in one or more frequency bands. An E-UTRAN Node B (eNB) 102 is an E-UTRA base station apparatus. An Evolved Packet Core (EPC) 104 is a core network described in NPL 14 or the like and has been designed as an E-UTRA core network. An interface 112 is an interface between the eNB 102 and the EPC 104 in which a Control Plane (CP) through which a control signal transfers and a User Plane (UP) through which its user data transfers are present.

An NR 106 is a new radio access technology currently studied in the 3GPP and includes a Cell Group (CG) configured in one or more frequency bands. A gNode B (gNB) 108 is a base station apparatus in the NR. A 5GC 110 is a new core network for NR currently studied in the 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and the 5GC 110. The interface 114, the interface 116, the interface 118, the interface 120, and the interface 124 are interfaces that transfer CP only, UP only, or both of the CP and the UP, and details are being discussed by the 3GPP. The interface 114, the interface 116, the interface 118, the interface 120, and the interface 124 may not be present depending on a communication system provided by a carrier.

A UE 122 is a terminal apparatus supporting both the E-UTRA and the NR.

FIG. 2 is a protocol stack diagram of the UP and the CP in the terminal apparatus and the base station apparatus in the E-UTRA according to each embodiment of the present invention.

FIG. 2(A) is a protocol stack diagram of the UP used in a case that the UE 122 communicates with the eNB 102.

A physical layer (PHY) 200 is a radio physical layer that provides a higher layer with a transmission service using a Physical Channel. The PHY 200 is connected to a Medium Access Control layer (MAC) 202 that is a higher layer to be described below via a Transport Channel. Data is exchanged between the MAC 202 and the PHY 200 via the transport channel. The data is transmitted and/or received between the PHYs of the UE 122 and the eNB 102 via the radio physical channel.

The MAC 202 maps various Logical Channels to various transport channels. The MAC 202 is connected with a Radio Link Control layer (RLC) 204 that is a higher layer to be described below via the logical channels. The logical channels are roughly classified according to a type of transmitted information, and classified into control channels transmitting control information and traffic channels transmitting user information. The MAC 202 has a function to control the PHY 200 to perform Discontinuous Reception and Transmission (DRX and DTX), a function to perform a Random Access procedure, a function to notify transmit power information, a function to control a HARQ, and the like (NPL 7).

An RLC 204 divides (Segmentation) the data received from a Packet Data Convergence Protocol Layer (PDCP) 206 that is a higher layer to be described later, and adjusts the data size such that a lower layer can properly transmit the data. The RLC 200 also has a function to ensure a Quality of Service (QoS) requested for each piece of data. In other words, the RLC 204 has a function of data retransmission control or the like (NPL 6).

A PDCP 206 may have a header compression function to compress unnecessary control information to efficiently transmit IP Packets, which is user data, in a radio segment. The PDCP 206 may also have a data encryption function (NPL 5).

Note that data processed in the MAC 202, the RLC 204, and the PDCP 206 is referred to as a MAC Protocol Data Unit (PDU), an RLC PDU, and a PDCP PDU, respectively. In addition, data passed from a higher layer to the MAC 202, the RLC 204, and the PDCP 206 is referred to as a MAC Service Data Unit (SDU), an RLC SDU, and a PDCP SDU, respectively.

FIG. 2(B) is a protocol stack diagram of the CP used in a case that the UE 122 communicates with the eNB 102.

In addition to the PHY 200, the MAC 202, the RLC 204, and the PDCP 206, a Radio Resource Control (RRC) layer 208 is present in the CP protocol stack. The RRC 208 configures and reconfigures Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message as the control information. The DRB may be used as a path for transmitting the user data. Each RB may be configured between the RRCs 208 of the eNB 102 and the UE 122 (NPL 4).

The functional classification of the MAC 202, the RLC 204, the PDCP 206, and the RRC 208 described above is an example, and some or all of the respective functions need not be implemented. Some or all of the functions of each layer may be included in another layer.

Figure 3:
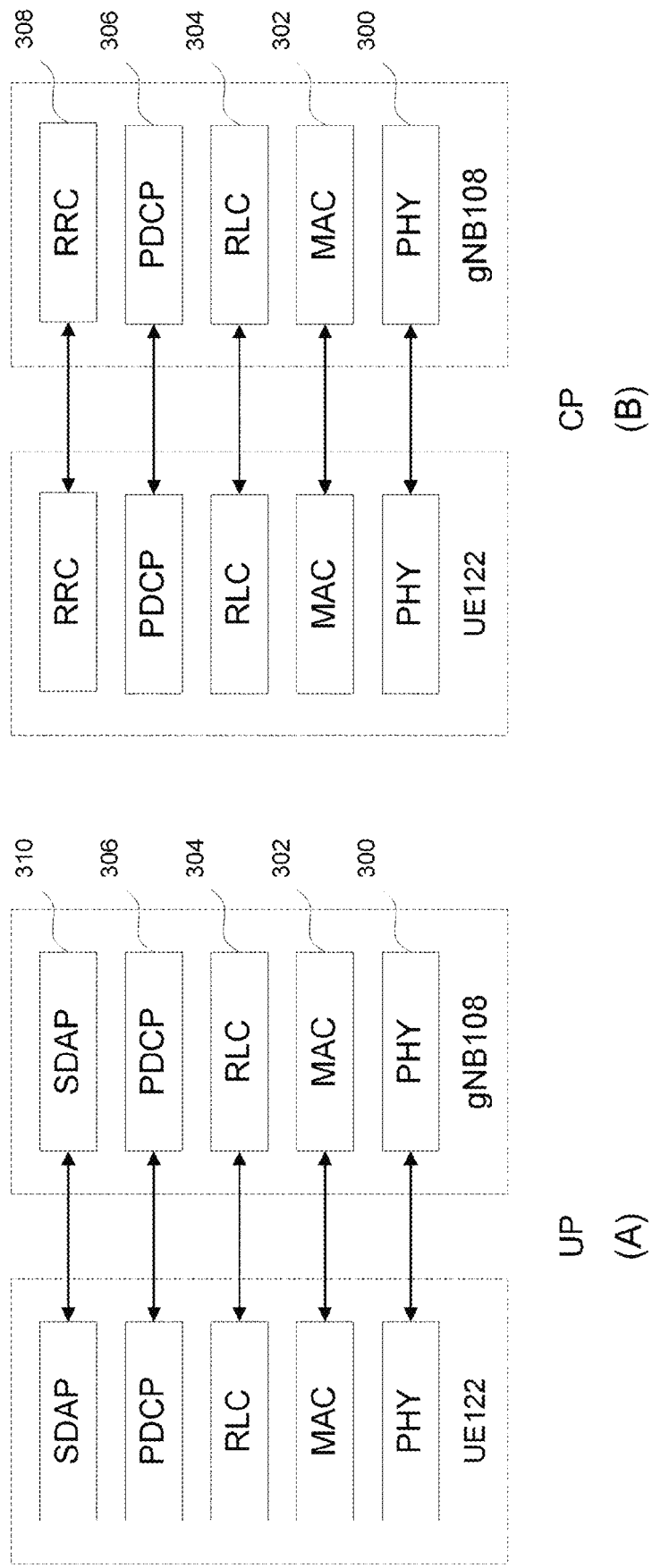
FIG. 3 is a protocol stack diagram of the UP and the CP of the terminal apparatus and the base station apparatus in NR according to each embodiment of the present invention.

FIG. 3 is a protocol stack diagram of the UP and the CP in the terminal apparatus and the base station apparatus in the NR according to each embodiment of the present invention.

FIG. 3(A) is a protocol stack diagram of the UP used in a case that the UE 122 communicates with the gNB 108.

A physical layer (PHY) 300 is a radio physical layer in the NR that may provide a higher layer with a transmission service using the Physical Channel. The PHY 300 may be connected to a Medium Access Control layer (MAC) 302 that is a higher layer to be described below via the Transport Channel. Data may be exchanged between the MAC 302 and the PHY 300 via the transport channel. The data may be transmitted and/or received between the PHYs of the UE 122 and the gNB 108 via the radio physical channel. Details of the PHY 300 are different from those of the PHY 200 which is the radio physical layer of the E-UTRA, and are being studied in the 3GPP.

The MAC 302 may map various Logical Channels to various transport channels. The MAC 302 may be connected with a Radio Link Control layer (RLC) 304 that is a higher layer to be described later via the logical channels. The logical channels may be roughly classified according to a type of transmitted information, and may be classified into control channels transmitting the control information and traffic channels transmitting the user information. The MAC 302 may have a function to control the PHY 300 to perform the Discontinuous Reception and Transmission (DRX and DTX), a function to perform the Random Access procedure, a function to notify the transmit power information, a function to control the HARQ, and the like (NPL 13). Details of the MAC 302 are different from those of the MAC 202 of the E-UTRA, and are being discussed in the 3GPP.

An RLC 304 may divide (Segmentation) data received from a Packet Data Convergence Protocol Layer (PDCP) 206 that is a higher layer to be described later, and adjust the data size such that a lower layer can properly transmit the data. The RLC 304 may also have a function to ensure Quality of Service (QoS) requested for each piece of data. In other words, the RLC 304 may have a function of data retransmission control or the like (NPL 12). Details of the RLC 304 are different from those of the RLC 204 in the E-UTRA, and are being discussed in the 3GPP.

A PDCP 306 may have a header compression function of compressing unnecessary control information to efficiently transmit an IP packet, which is the user data, in a radio segment. The PDCP 306 may also have a data encryption function (NPL 11). Details of the PDCP 306 are different from those of the PDCP 206 of the E-UTRA, and are under discussion by the 3GPP.

A Service Data Adaptation Protocol (SDAP) 310 may function to map QoS of data transmitted from the 5GC 110 to the gNB 108 and data transmitted from the gNB to the 5GC 110 to QoS of the RB (NPL 9). In a case that the eNB 102 is directly connected to the 5GC 110, that is, connected to the 5GC via the interface 114, or in a case that the eNB 102 is indirectly connected to the 5GC 110, that is, connected to the 5GC via the interface 120 and the interface 116, the SDAP 310 may be present as a higher layer of the PDCP 206, which is a PDCP of the E-UTRA. The details are under discussion by the 3GPP.

Note that data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. In addition, the data transferred from the higher layer to the MAC 202, the RLC 204, and the PDCP 206 may be referred to as a MAC Service Data Unit (SDU), an RLC SDU, a PDCP SDU, and an SDAP SDU, respectively.

FIG. 3(B) is a protocol stack diagram of the CP used in a case that the UE 122 communicates with the gNB 108.

In addition to the PHY 300, the MAC 302, the RLC 304, and the PDCP 306, a Radio Resource Control (RRC) layer 308 is present in the protocol stack of the CP. The RRC 308 may configure and reconfigure Radio Bearers (RBs) to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 208 of the gNB 108 and the UE 122 (NPL 10).

The functional classification of the MAC 302, the RLC 304, the PDCP 306, the SDAP 310, and the RRC 208 described above is an example, and some or all of the respective functions need not be implemented. Some or all of the functions of each layer may be included in another layer.

In the embodiments of the present invention, the MAC 202, the RLC 204, the PDCP 206, and the RRC 208 may be referred to as MAC for E-UTRA, RLC for E-UTRA, RLC for E-UTRA, and RRC for E-UTRA, respectively to distinguish protocols of the E-UTRA and the NR hereinbelow. The MAC 302, the RLC 304, the PDCP 306, and the RRC 308 may also be referred to as MAC for NR, RLC for NR, RLC for NR, and RRC for NR, respectively.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. The PDCP 206 in FIG. 2 may also be replaced with the PDCP 306 in FIG. 3. The RRC 308 in FIG. 3 may include the function of the RRC 208 in FIG. 2. The PDCP 306 in FIG. 3 may be the PDCP 206 in FIG. 2.

Figure 4:
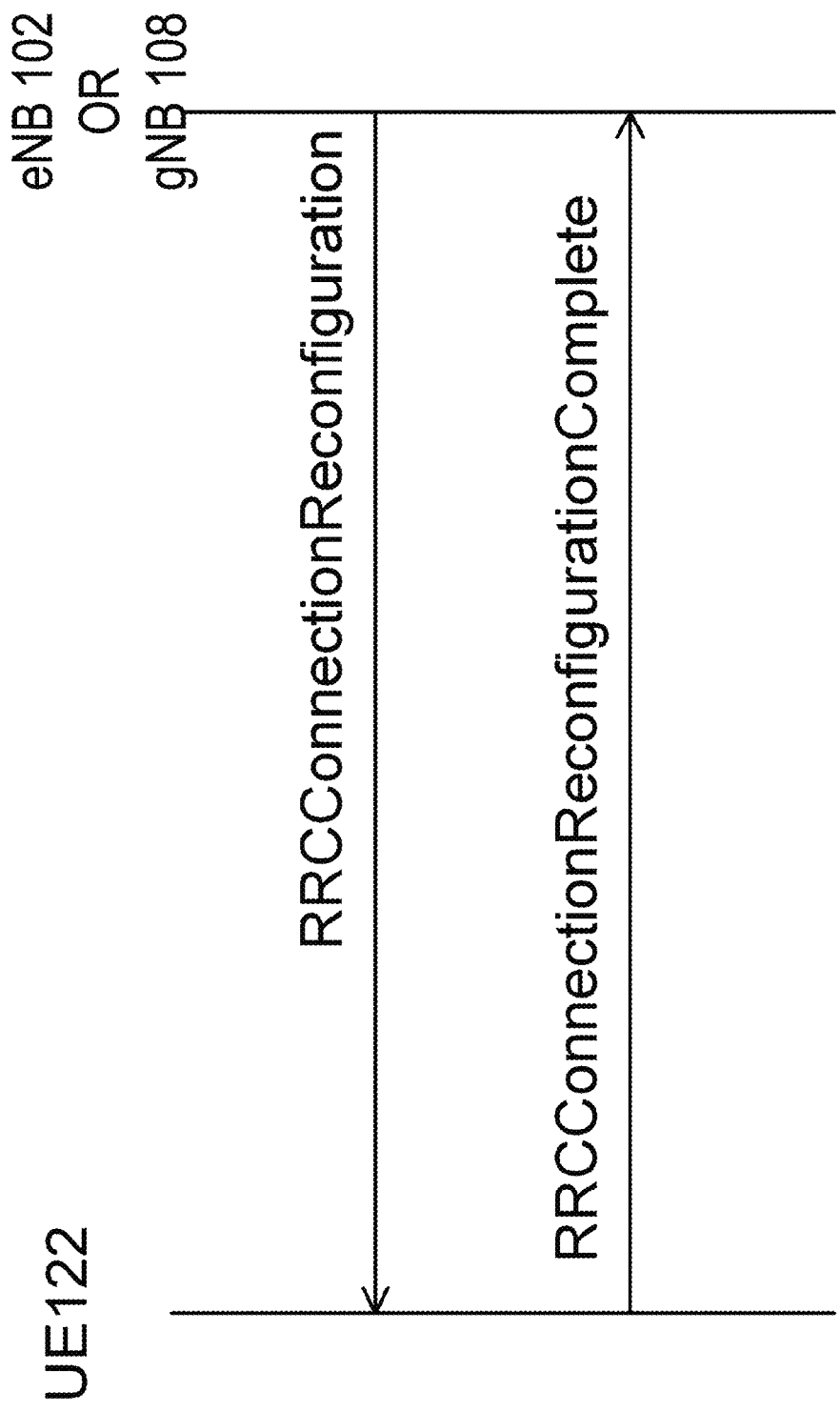
FIG. 4 is a drawing illustrating an example of a flow of an RRC connection reconfiguration procedure according to each embodiment of the present invention.

FIG. 4 is a drawing illustrating an example of a flow for an RRC connection reconfiguration procedure according to each embodiment of the present invention.

The RRC connection reconfiguration procedure is a procedure used to perform handover, measurement, and the like, in addition to establishment, change, and release of a RB, change and release of a secondary cell, and the like in the E-UTRA, which are described in NPL 4. Meanwhile, the RRC connection reconfiguration procedure may be used to perform establishment, change, and release of the RB, addition, change, and release of the secondary cell, handover and measurement, and the like, which may be described in NPL 10. According to each embodiment of the present invention, the procedure used to perform establishment, change, and release of the RB, addition, change, and release of the cell group, handover and measurement, and the like is referred to as the RRC connection reconfiguration procedure, or may have another designation. The RRC connection reconfiguration procedure according to each embodiment of the present invention may be an RRC connection reconfiguration procedure including establishing, changing, and releasing the RB in the NR; adding, changing, and releasing the cell group; the handover and measurement; and the like.

As illustrated in FIG. 4, in a case that the RRC connection reconfiguration is necessary, either the eNB 102 or the gNB 108 or both the eNB 102 and the gNB 108 transmit an RRC connection reconfiguration request message (RRCConnectionReconfiguration message) to the UE 122 (S400). The UE 122 that has received the RRC connection reconfiguration request message performs configuration in accordance with information (Information Element (IE)) or the like included in the RRC connection reconfiguration request message, and may transmit an RRC Connection Reconfiguration Complete message (RRCConnectionReconfigurationComplete message) to either the eNB 102 or the gNB 108 or both the eNB and the gNB, which are transmission sources of the RRC connection reconfiguration request message to notify that the configuration is completed (S402). Note that the RRCConnectionReconfiguration message and the RRCConnectionReconfigurationComplete message may have different message designations. The UE 122 may transmit the RRC connection reconfiguration complete message to both the eNB 102 and the gNB 108 regardless of whether the base station apparatus that has transmitted the RRC connection reconfiguration request is the eNB 102 or the gNB 108. The UE 122 may transmit a complete message to both the eNB 102 and the gNB 108 in response to a request message (RRCConnectionSetup, RRCConnectionReestablishment, or the like) transmitted from either the eNB 102 or the gNB 108 or both the eNB 102 and the gNB 108, not only in the RRC connection reconfiguration procedure, but also in all or some of other measures related to RRC (RRC connection establishment measures, RRC connection re-establishment measures, or the like), regardless of whether the base station apparatus that has transmitted the request message is the eNB 102 or the gNB 108.

Figure 5:
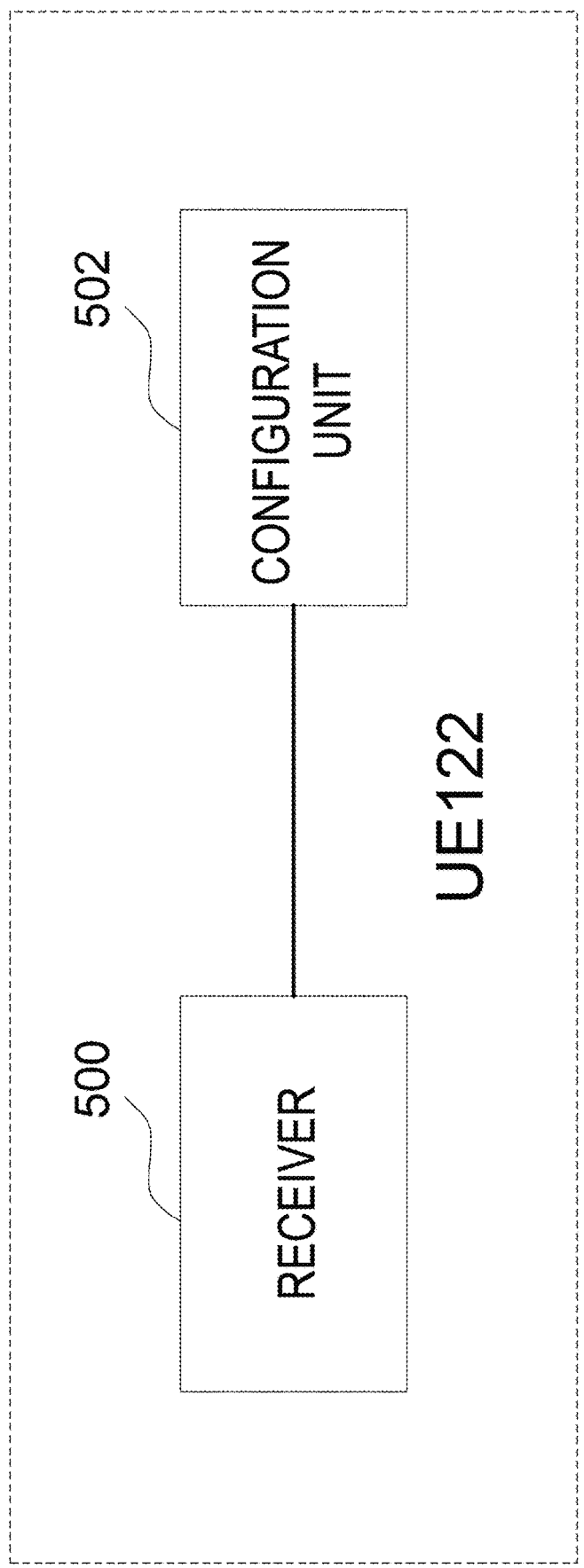
FIG. 5 is a block diagram of the terminal apparatus (UE) according to each embodiment of the present invention.

FIG. 5 is a block diagram illustrating a configuration of the terminal apparatus (UE) according to each embodiment of the present invention. Note that, FIG. 5 illustrates only main components closely related to the present invention in order to avoid complicated description.

The UE 122 illustrated in FIG. 5 includes a receiver 500 that receives an RRC connection reconfiguration request message from either the eNB 102 or the gNB 108 or both the eNB and the gNB, and a configuration unit 502 that configures a DRB in accordance with a DRB configuration in a case that DRB configuration information (DRB configuration) is included in the RRC connection reconfiguration request message. The UE 122 may include functions other than those of the receiver 500 and the configuration unit 502.

Embodiment 1

Embodiment 1 of the present invention will be described with reference to FIG. 1 to FIG. 9.

Figure 6:
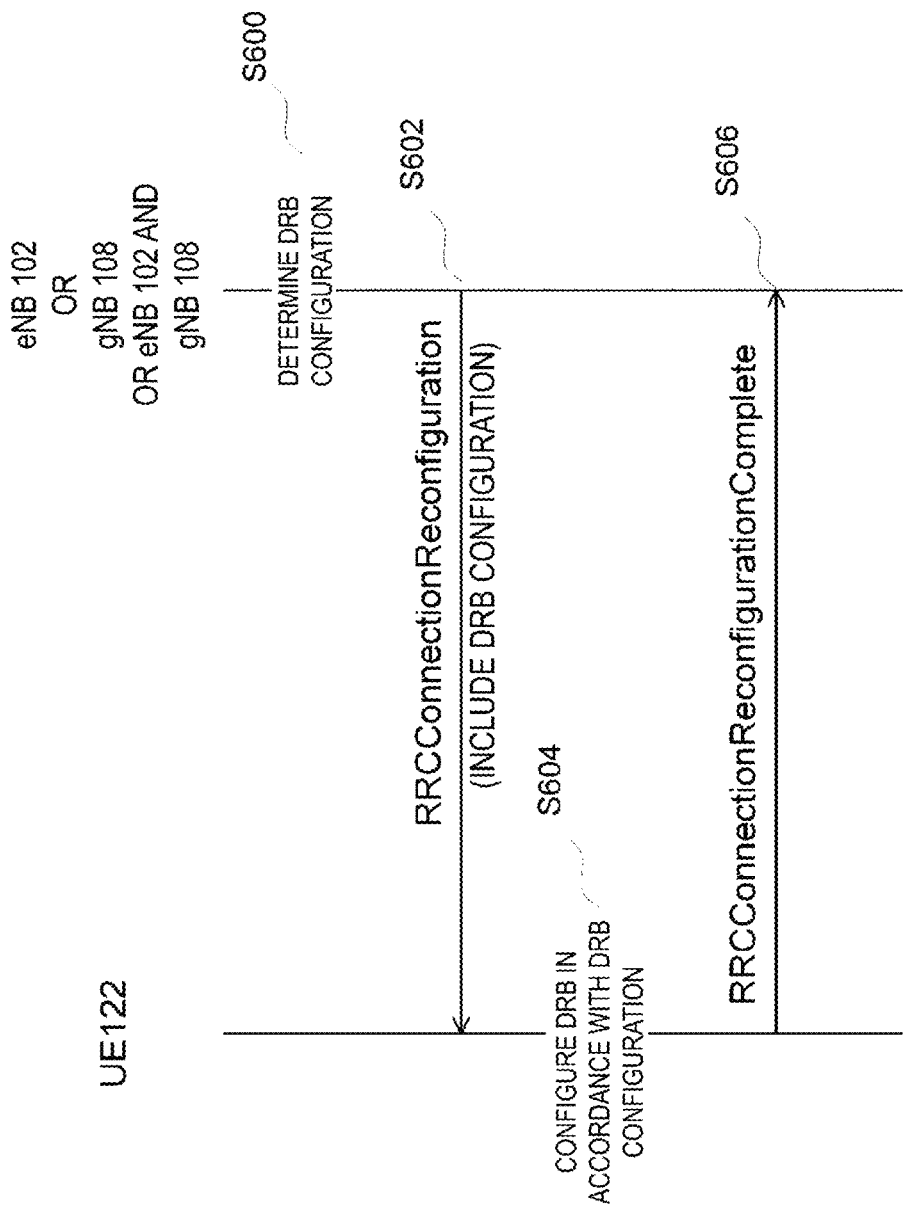
FIG. 6 is a diagram illustrating an example of DRB configuration reception and configuration according to Embodiment 1 of the present invention.

FIG. 6 is a diagram illustrating an example of DRB configuration reception and configuration according to the embodiment of the present invention. Either the eNB 102 or the gNB 108 or both the eNB 102 and the gNB 108 determine the DRB configuration to be requested to the UE 122 (S600). Either the eNB 102 or the gNB 108 or both the eNB 102 and the gNB 108 may determine the DRB configuration based on information from the core network (either the EPC 104 or the 5GC 110, or both the EPC 104 and the 5GC 110), capability of the UE 122, or the information from the core network and the capability of the UE 122. Note that the information from the core network may be determined based on a condition of an application service, such as a voice call, requested by the UE 122. Next, either the eNB 102 or the gNB 108 or both the eNB 102 and the gNB 108 generate an RRC Connection Reconfiguration request (RRCConnectionReconfiguration) message including the DRB configuration and transmit the message to the UE 122 (S602). The receiver 500 of the UE 122 receives the RRC connection reconfiguration request message including the DRB configuration and transfers the DRB configuration to the configuration unit 502.

FIGS. 7 and 8 each are one example of Abstract Syntax Notation One (ASN.1) for the DRB configuration. The specifications related to the RRC (NPL 4 and NPL 10) in the 3GPP describe messages, information (Information Element (IE)) related to the RRC, and the like by using ASN.1. Note that FIGS. 7 and 8 each are a part of one diagram. In other words, FIG. 7 is the first page of a diagram illustrating an example of ASN.1 for the DRB configuration, and FIG. 8 is the second page of the diagram illustrating an example of the ASN.1 related to the DRB configuration. In the examples of ASN.1 of FIGS. 7 and 8, <omitted> and <partly omitted> are not part of the description of ASN.1, but indicate that other pieces of information are omitted. Note that information may be omitted in a part where neither <omitted> or <partly omitted> is indicated.

In FIG. 8 among FIGS. 7 and 8, DRB-ToAddMod included in the RRCConnectionReconfiguration message is an IE of the DRB configuration. As illustrated in FIG. 8 among FIGS. 7 and 8, DRB-ToAddMod may include DRB-Identity, which is an IE of a DRB identity, and PDCP-Config, which is PDCP entity configuration information corresponding to the DRB identity. As illustrated in FIG. 8 among FIGS. 7 and 8, PDCP-Config, which is the PDCP entity configuration information, may select (CHOICE) and include PDCP-EUTRA-Config, which is PDCP entity configuration information for E-UTRA, or PDCP-NR-Config, which is PDCP entity configuration information for NR. As illustrated in FIG. 8 among FIGS. 7 and 8, PDCP-EUTRA-Config and PDCP-NR-Config may include pdcp-SN-Size information indicating a length of a Sequence Number (SN) of the PDCP, and the pdcp-SN-Size may be an integer including 7.

FIGS. 16, 17, and 18 illustrate another example of Abstract Syntax Notation One (ASN.1) for the DRB configuration. Note that FIGS. 16, 17, and 18 each are a part of one diagram. In other words, FIG. 16 is the first page of a diagram illustrating the other example of ASN.1 for the DRB configuration, FIG. 17 is the second page of the diagram illustrating the other example of ASN.1 for the DRB configuration, and FIG. 18 is the third page of the diagram illustrating the other example of ASN.1 for the DRB configuration. In the example of ASN.1 in FIGS. 16, 17, and 18, <omitted> and <partly omitted> are not part of the description of the ASN.1, but indicate that other pieces of information are omitted. Note that information may be omitted in a part where neither <omitted> or <partly omitted> is indicated.

In FIG. 16 among FIGS. 16, 17, and 18, the RRCConnectionReconfiguration message may select (CHOICE) and include RRCConnectionReconfiguration-EUTRA-IE, which is an IE of an RRC connection reconfiguration request for E-UTRA, or RRCConnectionReconfiguration-NR-IE, which is an IE of an RRC connection reconfiguration request for NR.

As illustrated in FIGS. 16 and 17 among FIGS. 16, 17, and 18, in a case that the IE of the RRC connection reconfiguration request for E-UTRA is selected, DRB-ToAddMod-EUTRA, which is an IE of the DRB configuration for E-UTRA, may be included. As illustrated in FIG. 17 among FIGS. 16, 17, and 18, DRB-ToAddMod-EUTRA may include DRB-Identity, which is an IE of the DRB identity, and PDCP-Config-EUTRA, which is PDCP entity configuration information for E-UTRA corresponding to the DRB identity. As illustrated in FIGS. 17 and 18 among FIGS. 16, 17, and 18, PDCP-Config-EUTRA, which is PDCP entity configuration information for E-UTRA, may further select (CHOICE) and include PDCP-EUTRA-Config, which is the PDCP entity configuration information for E-UTRA, or PDCP-NR-Config, which is the PDCP entity configuration information for NR, as a PDCP entity configuration for E-UTRA. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

As illustrated in FIG. 16 and FIG. 17 among FIGS. 16, 17, and 18, in a case that the IE of the RRC connection reconfiguration request for NR is selected, DRB-ToAddMod-NR, which is an IE of the DRB configuration for NR, may be included. As illustrated in FIG. 17 among FIGS. 16, 17, and 18, DRB-ToAddMod-NR may include the DRB-Identity, which is the IE of the DRB identity, and PDCP-Config-NR, which is the PDCP entity configuration information for NR corresponding to the DRB identity. As illustrated in FIGS. 17 and 18 among FIGS. 16, 17, and 18, PDCP-Config-NR, which is the PDCP entity configuration information for NR, may further select (CHOICE) and include PDCP-EUTRA-Config, which is the PDCP entity configuration information for E-UTRA, or PDCP-NR-Config, which is the PDCP entity configuration information for NR, as a PDCP entity configuration for NR. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

Note that the message designation, IE designation, parameter designation, and the like of ASN.1 in FIGS. 7 and 8, and FIGS. 16, 17, and 18 are examples and other designations may be possible. In FIGS. 7 and 8, and FIGS. 16, 17, and 18, an RLC entity for E-UTRA and an RLC entity for NR may be described in a similar manner to the description of a PDCP entity for E-UTRA and a PDCP entity for NR. Also, in FIGS. 7 and 8, and FIGS. 16, 17, and 18, a MAC entity for E-UTRA (such as MACMainConfig (not illustrated) and logicalChannelConfig) and a MAC entity for NR may be described in a similar manner to the description of the PDCP entity for E-UTRA and the PDCP entity for NR.

In S604 of FIG. 6, the DRB configuration that the receiver 500 of the UE 122 transfers to the configuration unit 502 of the UE 122 includes at least the DRB identity and either the PDCP entity configuration for E-UTRA or the PDCP entity configuration for NR as a PDCP entity configuration corresponding to the DRB identity. The configuration unit 502 of the UE 122 establishes or reestablishes the PDCP entity in accordance with the DRB identity and the PDCP entity configuration corresponding to the DRB identity.

Figure 9:
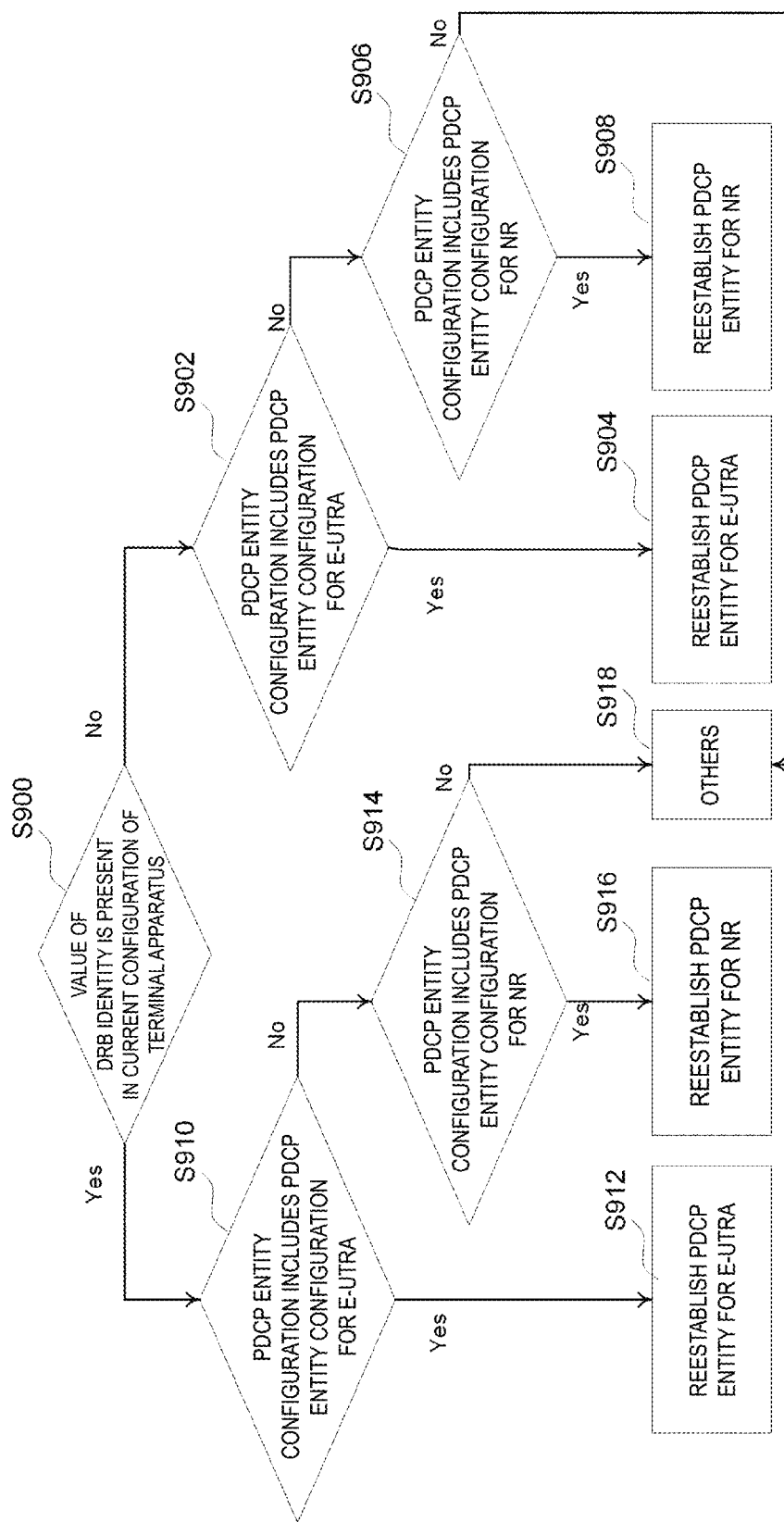
FIG. 9 is a diagram illustrating an example of determination of a PDCP configuration by a configuration unit of the terminal apparatus according to Embodiment 1 of the present invention.

FIG. 9 is an example of determination of the PDCP configuration by the configuration unit of the terminal apparatus according to the embodiment of the present invention. The configuration unit 502 of the UE 122 checks whether a value of the DRB identity is present in the current configuration of the terminal apparatus (S900). In a case that the value is absent, whether the PDCP entity for E-UTRA is included in the PDCP entity configuration corresponding to the DRB identity is checked (S902). In a case that the PDCP entity for E-UTRA is included, the PDCP entity for E-UTRA is established in accordance with the PDCP entity configuration information for E-UTRA (S904). On the other hand, in a case that the PDCP entity configuration corresponding to the DRB identity does not include the PDCP entity for E-UTRA, whether the PDCP entity configuration corresponding to the DRB identity includes the PDCP entity for NR is further checked (S906). In a case that the PDCP entity for NR is included, the PDCP entity for NR is established in accordance with the PDCP entity configuration information for NR (S908). In a case that the PDCP entity configuration corresponding to the DRB identity does not include the PDCP entity for NR, another configuration is performed (S918).

On the other hand, in a case that the value of the DRB identity is present in the current configuration of the terminal apparatus, whether the PDCP entity configuration corresponding to the DRB identity includes the PDCP entity for E-UTRA is checked (S910). In a case that the PDCP entity for E-UTRA is included, the PDCP entity for E-UTRA is reestablished in accordance with the PDCP entity configuration information for E-UTRA (S912). On the other hand, in a case that the PDCP entity configuration corresponding to the DRB identity does not include the PDCP entity for E-UTRA, whether the PDCP entity configuration corresponding to the DRB identity includes the PDCP entity for NR is further checked (S914). In a case that the PDCP entity for NR is included, the PDCP entity for NR is reestablished in accordance with the PDCP entity configuration information for NR (S916). In a case that the PDCP entity configuration corresponding to the DRB identity does not include the PDCP entity for NR, another configuration is performed (S918). The reestablishment processing may switch the entity between the PDCP entity for E-UTRA and the PDCP entity for NR. For example, in a case that the PDCP entity configuration corresponding to a certain DRB identity (denoted as a DRB identity 1) present in the current configuration of the UE 122 is the PDCP entity for E-UTRA and in a case that the DRB configuration included in the received RRC connection reconfiguration message includes the above-described DRB identity 1 and the PDCP entity configuration corresponding to the DRB identity 1 is the PDCP entity configuration for NR, the PDCP entity corresponding to the DRB identity 1 is reconfigured as the PDCP entity for NR. Similarly, in a case that the PDCP entity configuration corresponding to a certain DRB identity (denoted as a DRB identity 2) present in the current configuration of the UE 122 is the PDCP entity for NR, and in a case that the DRB configuration included in the received RRC connection reconfiguration message includes the above-described DRB identity 2 and the PDCP entity configuration corresponding to the DRB identity 2 is the PDCP entity configuration for E-UTRA, the PDCP entity corresponding to the DRB identity 2 is reconfigured as the PDCP entity for E-UTRA. In this manner, the PDCP entity configuration for E-UTRA and the PDCP entity configuration for NR may be switched by the RRC connection reconfiguration message.

In FIG. 6, after completing the configuration in the configuration unit 502 of the UE 122, the UE 122 transmits the RRC Connection Reconfiguration Complete (RRCConnectionReconfigurationComplete) message to either the eNB 102 or the gNB 108 or both the eNB 102 and the gNB 108 (S606).

Note that the DRB configuration according to the present embodiment may be included in an RRC Connection Establishment procedure and an RRC Connection Re-establishment procedure, in addition to the RRC connection reconfiguration procedure. The reestablishment of the PDCP entity in the present embodiment may include, for example, zero reset of a Hyper Frame Number (HFN), a change to an initial (Initialization and Refresh (IR)) mode of header compression, a change to a designated cryptographic algorithm and cryptographic key, and the like, which are described in NPL 5.

Note that the zero reset of the Hyper Frame Number (HFN), the change to the initial (Initialization and Refresh (IR)) mode of header compression, and the change to the designated cryptographic algorithm and cryptographic key, which are described in Non Patent Literature, are for E-UTRA, but may be applied for NR.

Thus, in the present embodiment, based on a condition of an application service, such as a voice call, requested by the terminal apparatus (UE) and the like, the base station apparatus of E-UTRA (eNB) or the base station apparatus of NR (gNB), or the eNB and gNB select whether the PDCP entity to be used in communication with the UE is for E-UTRA or NR, and notify the UE of the result of the selection using the RRC connection reconfiguration message. Thus, the PDCP entity suitable for the application service used by the UE can be established, and communication can be efficiently performed with reduced complexity of protocol processing.

Embodiment 2

In Embodiment 2 of the present invention, a DRB configuration in a case of E-UTRAN supports Multi-RAT Dual Connectivity (MR-DC) via E-UTRA-NR Dual Connectivity (EN-DC) will be described below. In the EN-DC, especially an EPC serves as a core network and the base station apparatus on the E-UTRA side serves as a master base station apparatus described later in Multi-RAT Dual Connectivity (MR-DC). The MR-DC is a mechanism that has been studied as one of technologies for NR. In the MR-DC, cells of Radio Access Technologies (RATs) of both E-UTRA and NR are cell-grouped for each RAT and allocated to a UE for communication between the UE and one or more base station apparatuses.

The second embodiment will be described with reference to FIG. 1 and FIGS. 5 to 12.

Figure 10:
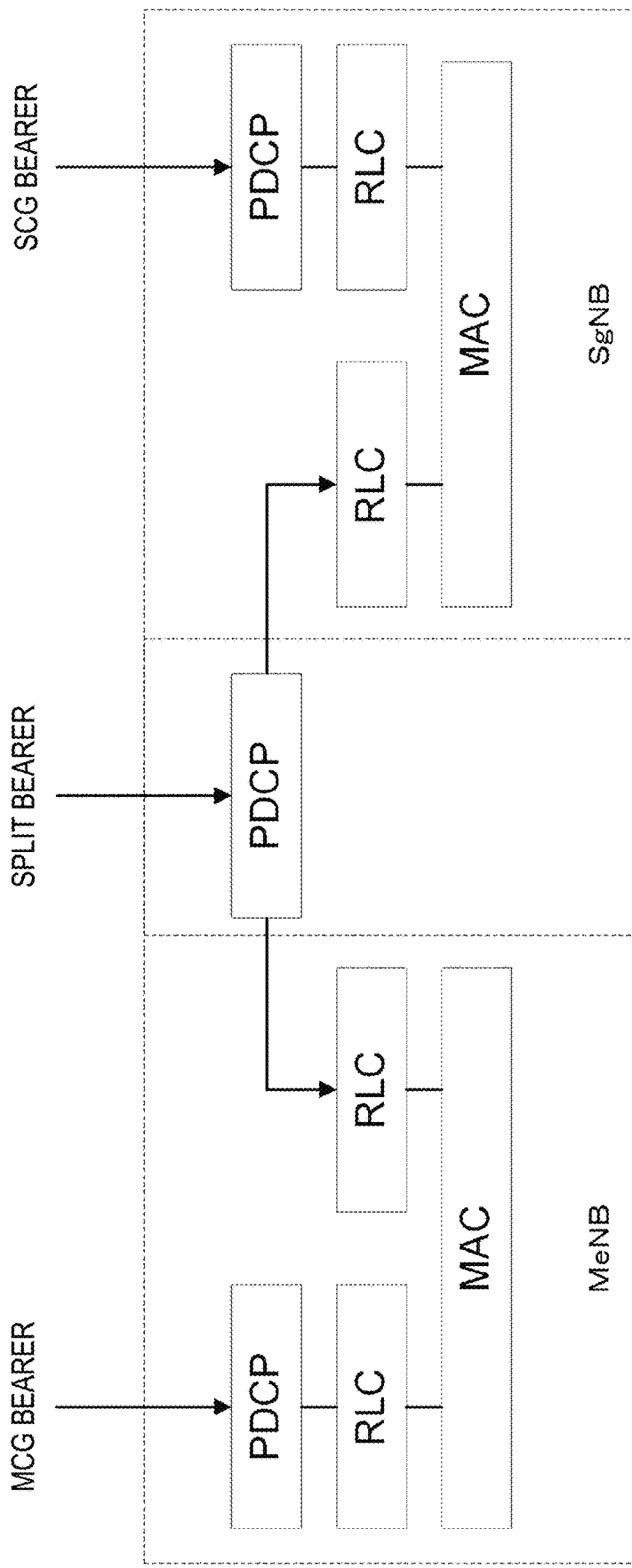
FIG. 10 is a diagram illustrating an example of a relationship between radio protocol architecture and RBs in EN-DC on the base station apparatus side according to Embodiment 2 of the present invention.

FIG. 10 is a diagram illustrating an example of a relationship between radio protocol architecture and RBs in the EN-DC on the base station apparatus side according to the embodiment of the present invention.

The EN-DC may be a technology for performing data communication by using radio resources of two cell groups respectively configured by two base station apparatuses with EPC as a core network. The two base station apparatuses, that is, a base station apparatus of E-UTRA as a master base station (Master eNB (MeNB)) and a base station apparatus of NR as a secondary base station (Secondary gNB (SgNB)) respectively configures the two cell groups, that is a Master Cell Group (MCG) configured by the MeNB and a Secondary Cell Group (SCG) configured by the SgNB. In the MR-DC, the master base station may be a base station having main RRC functions related to the MR-DC, for example, establishment, change, and release of the RB, addition, change, and release of an additional cell such as a secondary cell, handover, and the like, and the secondary base station may be a base station having some RRC functions, for example, change and release of the SCG, and the like.

As illustrated in FIG. 10, in the EN-DC, some pieces of data to be transmitted and/or received are transmitted and/or received on the SgNB side, and the remainder is transmitted and/or received on the MeNB side. A data transmission and/or reception method in the EN-DC may include a method in which a node in the EPC serves as an anchor point as a point of bifurcation and confluence of data and each of the MeNB and the SgNB establishes a bearer as a logical path with the EPC to perform data transmission and/or reception, that is, data is transmitted and/or received using an MCG bearer on the MeNB side and an SCG bearer on the SgNB side, and a method in which the MeNB or the SeNB serves as the anchor point, and data transmission and/or reception is performed using a split bearer obtained by splitting a Radio Bearer (RB), which is a bearer on the radio side, for the MeNB and the SeNB. As for the split bearer, there may be a method for establishing the split bearer at the time of establishing the radio bearer and a method for establishing the MCG bearer or the SCG bearer and then changes the MCG bearer or the SCG bearer to the split bearer by adding the radio bearer on the SCG side or the MCG side. The establishment and change of the MCG bearer, the SCG bearer, and the split bearer may be performed by a Radio Resource Control (RRC) Connection Reconfiguration procedure transmitted between the MeNB and the UE. In the present embodiment, the cell group of the base station apparatus serving as the anchor point of the split bearer is referred to as an anchor cell Group and the cell group of the base station apparatus that does not serve as the anchor point of the split bearer is referred to as an additional cell group. The anchor cell group may be the MCG and the additional cell group may be the SCG, or the anchor cell group may be the SCG and the additional cell group may be the MCG. The split bearer in the case that the anchor cell group is the MCG may be referred to as an MCG split bearer, or the split bearer in the case that the anchor cell group is the SCG may be referred to as an SCG split bearer.

In the EN-DC, with respect to downlink data in a case of data transmission and/or reception using the split bearer, part of the downlink data transferred from the EPC may be distributed by the base station apparatus of the anchor cell group to the base station apparatus of the additional cell group, and transmitted by the base station apparatus of the additional cell group to the UE, and the remaining data may be transmitted from the base station apparatus of the master cell group to the UE. With respect to uplink data, part of the uplink data may be transmitted by the UE to the base station apparatus of the additional cell group and distributed by the base station apparatus of the additional cell group to the base station apparatus of the master cell group, and the remaining data may be transmitted by the UE to the base station apparatus of the master cell group.

As illustrated in FIG. 10, in a case that the split bearer is used, the PDCP PDU may be transmitted and/or received between the base station apparatus of the master cell group and the base station apparatus of the additional cell group.

Figure 11:
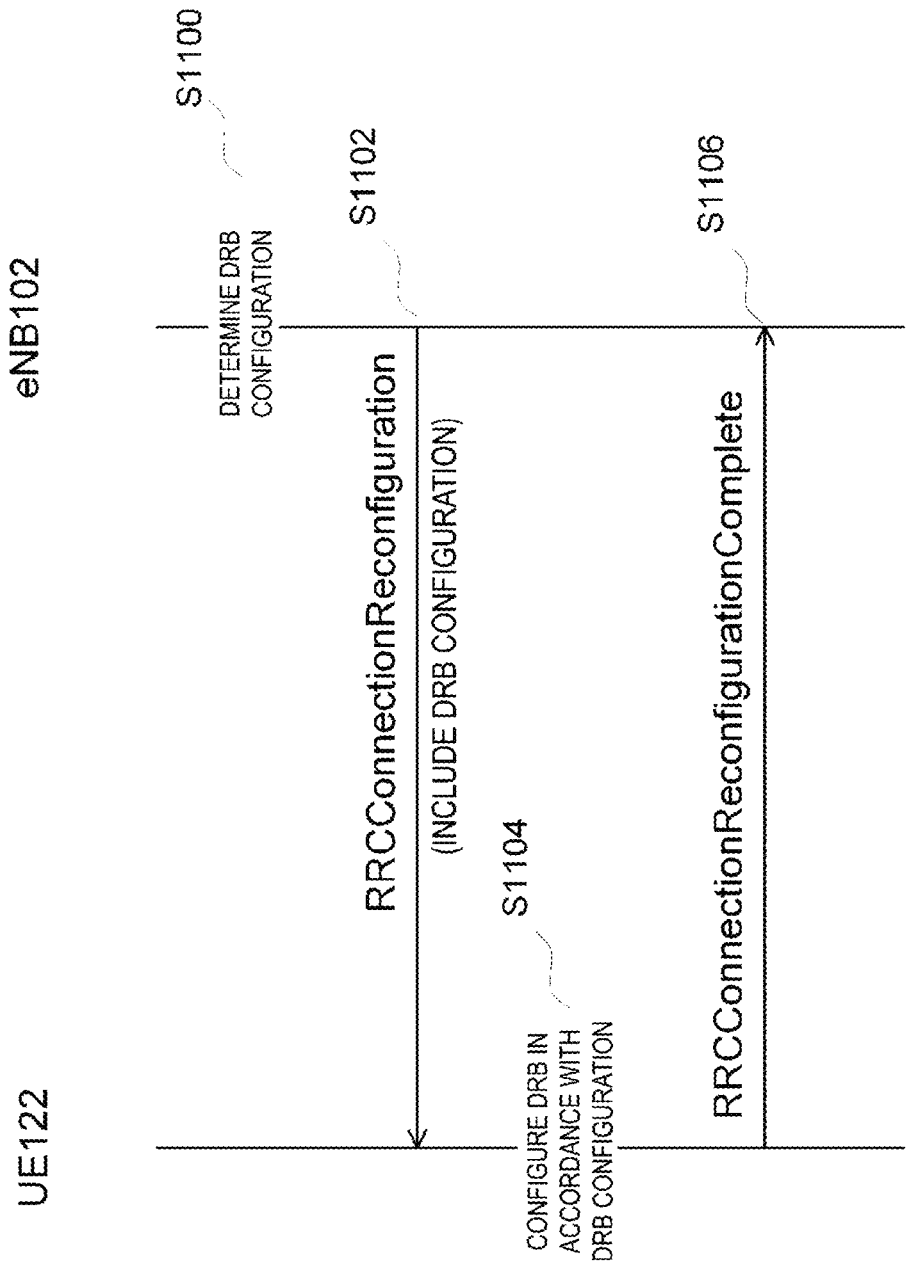
FIG. 11 is a diagram illustrating an example of the DRB configuration reception and configuration in a case that an MCG bearer or an SCG bearer is established as a bearer of an anchor cell group according to Embodiment 2 of the present invention.

FIG. 11 is a diagram illustrating an example of the DRB configuration reception and configuration in a case that the MCG bearer or the SCG bearer is established as a bearer of an anchor cell group according to the embodiment of the present invention. Note that even in a case that a bearer is established as the anchor cell group, the bearer need not be changed to the split bearer later. The eNB 102 determines the DRB configuration to be requested to the UE 122 (S1100). The eNB 102 may determine the DRB configuration based on either information from the core network (EPC 104) or capability of the UE 122, or the information from the core network and the capability of the UE 122. Note that the information from the core network may be determined based on a condition of an application service, such as a voice call, requested by the UE 122. Next, the eNB 102 generates the RRC connection reconfiguration request (RRCConnection-Reconfiguration) message including the DRB configuration and transmits the message to the UE 122 (S1102). The receiver 500 of the UE 122 receives the RRC connection reconfiguration request message including the DRB configuration and transfers the DRB configuration to the configuration unit 502.

FIGS. 7 and 8 are one example of Abstract Syntax Notation One (ASN.1) for the DRB configuration described in Embodiment 1.

In other words, in FIG. 8 among FIGS. 7 and 8, DRB-ToAddMod included in the RRCConnectionReconfiguration message is the IE of the DRB configuration. As illustrated in FIG. 8 among FIGS. 7 and 8, DRB-ToAddMod may include a DRB-Identity, which is an IE of a DRB identity, and PDCP-Config, which is PDCP entity configuration information corresponding to the DRB identity. As illustrated in FIG. 8 among FIGS. 7 and 8, PDCP-Config, which is the PDCP entity configuration information, may select (CHOICE) and include PDCP-EUTRA-Config, which is the PDCP entity configuration information for E-UTRA, or PDCP-NR-Config, which is the PDCP entity configuration information for NR. As illustrated in FIG. 8 among FIGS. 7 and 8, PDCP-EUTRA-Config and PDCP-NR-Config may include pdcp-SN-Size information indicating the length of the Sequence Number (SN) of the PDCP, and the pdcp-SN-Size may be an integer including 7.

FIGS. 16, 17, and 18 illustrate another example of Abstract Syntax Notation One (ASN.1) for the DRB configuration described in Embodiment 1.

That is, in FIG. 16 among FIGS. 16, 17, and 18, the RRCConnectionReconfiguration message may select (CHOICE) and include the RRCConnectionReconfiguration-EUTRA-IE, which is the IE of the RRC connection reconfiguration request for E-UTRA, or the RRCConnectionReconfiguration-NR-IE, which is the IE of the RRC connection reconfiguration request for NR.

As illustrated in FIGS. 16 and 17 among FIGS. 16, 17, and 18, in a case that the IE of the RRC connection reconfiguration request for E-UTRA is selected, DRB-ToAddMod-EUTRA, which is the IE of the DRB configuration for E-UTRA, may be included. As illustrated in FIG. 17 among FIGS. 16, 17, and 18, DRB-ToAddMod-EUTRA may include the DRB-Identity, which is the IE of the DRB identity, and PDCP-Config-EUTRA, which is the PDCP entity configuration information for E-UTRA corresponding to the DRB identity. As illustrated in FIGS. 17 and 18 among FIGS. 16, 17, and 18, PDCP-Config-EUTRA, which is the PDCP entity configuration information for E-UTRA, may further select (CHOICE) and include PDCP-EUTRA-Config, which is the PDCP entity configuration information for E-UTRA, or PDCP-NR-Config, which is the PDCP entity configuration information for NR, as the PDCP entity configuration for E-UTRA. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

As illustrated in FIGS. 16 and 17 among FIGS. 16, 17, and 18, in a case that the IE of the RRC connection reconfiguration request for NR is selected, DRB-ToAddMod-NR, which is the IE of the DRB configuration for NR, may be included. As illustrated in FIG. 17 among FIGS. 16, 17, and 18, DRB-ToAddMod-NR may include the DRB-Identity, which is the IE of the DRB identity, and PDCP-Config-NR, which is the PDCP entity configuration information for NR corresponding to the DRB identity. As illustrated in FIGS. 17 and 18 among FIGS. 16, 17, and 18, PDCP-Config-NR, which is the PDCP entity configuration information for NR, may further select (CHOICE) and include PDCP-EUTRA-Config, which is the PDCP entity configuration information for E-UTRA, or PDCP-NR-Config, which is the PDCP entity configuration information for NR, as the PDCP entity configuration for NR. As illustrated in FIG. 18 among FIGS. 16, 17, and 18, PDCP-EUTRA-Config and PDCP-NR-Config may include the pdcp-SN-Size information indicating the length of the Sequence Number (SN) of the PDCP, and the pdcp-SN-Size may be an integer including 7.

Note that, as described in Embodiment 1, the message designation, IE designation, parameter designation, and the like of ASN.1 in FIGS. 7 and 8, and FIGS. 16, 17, and 18 are examples and other designations may be possible. In FIGS. 7 and 8, and FIGS. 16, 17, and 18, an RLC entity for E-UTRA and an RLC entity for NR may be described in a similar manner to the description of a PDCP entity for E-UTRA and a PDCP entity for NR. Also, in FIGS. 7 and 8, and FIGS. 16, 17, and 18, the MAC entity for E-UTRA (such as MACMainConfig (not illustrated) and logicalChannelConfig) and the MAC entity for NR may be described in a similar manner to the description of the PDCP entity for E-UTRA and the PDCP entity for NR.

In S1104 of FIG. 11, the DRB configuration that the receiver 500 of the UE 122 transfers to the configuration unit 502 of the UE 122 includes at least the DRB identity and either the PDCP entity configuration for E-UTRA or the PDCP entity configuration for NR as the PDCP entity configuration corresponding to the DRB identity. The configuration unit 502 of the UE 122 establishes or reestablishes the PDCP entity in accordance with the DRB identity and the PDCP entity configuration corresponding to the DRB identity.

As described in Embodiment 1, FIG. 9 is an example of determination of the PDCP configuration by the configuration unit of the terminal apparatus. In other words, the configuration unit 502 of the UE 122 checks whether the value of the DRB identity is present in the current configuration of the terminal apparatus (S900). In a case that the value is absent, whether the PDCP entity for E-UTRA is included in the PDCP entity configuration corresponding to the DRB identity is checked (S902). In a case that the PDCP entity for E-UTRA is included, the PDCP entity for E-UTRA is established in accordance with the PDCP entity configuration information for E-UTRA (S904). On the other hand, in a case that the PDCP entity configuration corresponding to the DRB identity does not include the PDCP entity for E-UTRA, whether the PDCP entity configuration corresponding to the DRB identity includes the PDCP entity for NR is further checked (S906). In a case that the PDCP entity for NR is included, the PDCP entity for NR is established in accordance with the PDCP entity configuration information for NR (S908). In a case that the PDCP entity configuration corresponding to the DRB identity does not include the PDCP entity for NR, another configuration is performed (S918).

On the other hand, in a case that the value of the DRB identity is present in the current configuration of the terminal apparatus, whether the PDCP entity configuration corresponding to the DRB identity includes the PDCP entity for E-UTRA is checked (S910). In a case that the PDCP entity for E-UTRA is included, the PDCP entity for E-UTRA is reestablished in accordance with the PDCP entity configuration information for E-UTRA (S912). On the other hand, in a case that the PDCP entity configuration corresponding to the DRB identity does not include the PDCP entity for E-UTRA, whether the PDCP entity configuration corresponding to the DRB identity includes the PDCP entity for NR is further checked (S914). In a case that the PDCP entity for NR is included, the PDCP entity for NR is reestablished in accordance with the PDCP entity configuration information for NR (S916). In a case that the PDCP entity configuration corresponding to the DRB identity does not include the PDCP entity for NR, another configuration is performed (S918). The reestablishment processing may switch the entity between the PDCP entity for E-UTRA and the PDCP entity for NR. For example, in a case that the PDCP entity configuration corresponding to a certain DRB identity (denoted as a DRB identity 1) present in the current configuration of the UE 122 is the PDCP entity for E-UTRA and in a case that the DRB configuration included in the received RRC connection reconfiguration message includes the above-described DRB identity 1 and the PDCP entity configuration corresponding to the DRB identity 1 is the PDCP entity configuration for NR, the PDCP entity corresponding to the DRB identity 1 is reconfigured as the PDCP entity for NR. Similarly, in a case that the PDCP entity configuration corresponding to a certain DRB identity (denoted as a DRB identity 2) present in the current configuration of the UE 122 is the PDCP entity for NR, and in a case that the DRB configuration included in the received RRC connection reconfiguration message includes the above-described DRB identity 2 and the PDCP entity configuration corresponding to the DRB identity 2 is the PDCP entity configuration for E-UTRA, the PDCP entity corresponding to the DRB identity 2 is reconfigured as the PDCP entity for E-UTRA. In this manner, the PDCP entity configuration for E-UTRA and the PDCP entity configuration for NR may be switched by the RRC connection reconfiguration message.

In FIG. 11, after completing the configuration in the configuration unit 502 of the UE 122, the UE 122 transmits the RRC Connection Reconfiguration Complete (RRCConnectionReconfigurationComplete) message to the eNB 102 (S1106).

Note that the DRB configuration according to the present embodiment may be included in an RRC Connection Establishment procedure and an RRC Connection Reestablishment procedure, in addition to the RRC connection reconfiguration procedure. The reestablishment of the PDCP entity according to the present embodiment may include, for example, zero reset of a Hyper Frame Number (HFN), a change to an initial (Initialization and Refresh (IR)) mode of header compression, a change to a designated cryptographic algorithm and cryptographic key, and the like, which are described in NPL 5.

Note that the zero reset of the Hyper Frame Number (HFN), the change to the initial (Initialization and Refresh (IR)) mode of header compression, and the change to the designated cryptographic algorithm and cryptographic key, which are described in Non Patent Literature, are for E-UTRA, but may be applied for NR.

Next, a change from the MCG bearer or the SCG bearer to the split bearer will be described.

FIG. 12 is an example of Abstract Syntax Notation One (ASN.1) for the DRB configuration of the additional cell group in a case that the MCG bearer or the SCG bearer is changed to the split bearer. In the example of ASN.1 in FIG. 12, <omitted> and <partly omitted> are not part of the description of ASN.1, but indicate that other pieces of information are omitted. Note that information may be omitted in a part where <omitted> or <partly omitted> is not described. The example of ASN.1 illustrated in FIG. 12 may be a part of the examples of ASN.1 illustrated in FIGS. 7 and 8, or FIGS. 16, 17, and 18. The IE of DRB-ToAddModADDCG-NR IE illustrated in FIG. 12 is related to the DRB configuration of an additional cell group and may have another designation. The IE of DRB-ToAddModADDCG-NR IE illustrated in FIG. 12 may be a part of a higher IE related to additional cell group configuration.

In FIG. 11, the eNB 102 determines the DRB configuration of the anchor cell group to be requested to the UE 122 and the DRB configuration of the additional cell group (S1100). However, the DRB configuration of the anchor cell group need not be changed. In a case that the DRB configuration of the anchor cell group is changed, the DRB configuration of the anchor cell group may include the DRB identity and entity configuration information, such as the PDCP entity configuration to be changed corresponding to the DRB identity. Additionally, in a case that the DRB configuration of the anchor cell group is not changed, the DRB configuration of the anchor cell group may include only the DRB identity. The eNB 102 may determine whether to change the DRB configuration of the anchor cell group based on either the information from the core network (EPC 104) or the capability of the UE 122, or the information from the core network and the capability of the UE 122. Note that the information from the core network may be determined based on a condition of an application service, such as a voice call, requested by the UE 122. Next, the eNB 102 generates the RRC connection reconfiguration request (RRCConnectionReconfiguration) message including the DRB configuration of the anchor cell and the DRB configuration of the additional cell and transmits the message to the UE 122 (S1102). The receiver 500 of the UE 122 receives the RRC connection reconfiguration request message including the DRB configuration of the anchor cell and the DRB configuration of the additional cell and transfers the DRB configuration of the anchor cell and the DRB configuration of the additional cell to the configuration unit 502.

In a case that a value of the DRB identity included in the DRB configuration of the anchor cell group is present in the current configuration of the UE 122 and in a case that the DRB identity included in the DRB configuration of the anchor cell group is the DRB identity included in the DRB configuration of the additional cell group, that is, in a case that the value of the DRB identity of the anchor cell group and the value of the DRB identity of the additional cell group are the same, and in a case that a DRB type of the additional cell group (such as drb-Type-NR in FIG. 12) is split, the configuration unit 502 of the UE 122 determines to change the MCG bearer or the SCG bearer that is already present to the split bearer. Note that the determination method for changing the MCG bearer or the SCG bearer that is already present to the split bearer is not limited to the above, and another method may be applied.

The configuration unit 502 of the UE 122 may establish the DRB of the additional cell group in accordance with the DRB configuration of the additional cell group, and may reestablish the PDCP entity in accordance with the PDCP entity configuration in a case that the PDCP entity configuration corresponding to the DRB identity is present in the DRB configuration of the anchor cell group. The reestablishment processing may switch the entity between the PDCP entity for E-UTRA and the PDCP entity for NR. For example, in a case that the PDCP entity configuration corresponding to a certain DRB identity (denoted as a DRB identity 1) present in the current configuration of the UE 122 is the PDCP entity for E-UTRA and in a case that the DRB configuration included in the received RRC connection reconfiguration message includes the above-described DRB identity 1 and the PDCP entity configuration corresponding to the DRB identity 1 is the PDCP entity configuration for NR, the PDCP entity corresponding to the DRB identity 1 is reconfigured as the PDCP entity for NR. Similarly, in a case that the PDCP entity configuration corresponding to a certain DRB identity (denoted as a DRB identity 2) present in the current configuration of the UE 122 is the PDCP entity for NR, and in a case that the DRB configuration included in the received RRC connection reconfiguration message includes the above-described DRB identity 2 and the PDCP entity configuration corresponding to the DRB identity 2 is the PDCP entity configuration for E-UTRA, the PDCP entity corresponding to the DRB identity 2 is reconfigured as the PDCP entity for E-UTRA. In this manner, the PDCP entity configuration for E-UTRA and the PDCP entity configuration for NR may be switched by the RRC connection reconfiguration message.

Thus, according to the present embodiment, in the case of the EN-DC as well, based on a condition of an application service, such as a voice call, requested by the terminal apparatus (UE) and the like, the anchor cell group selects whether the PDCP entity used in communication with the UE is for E-UTRA or NR, and notifies the UE of the result of the selection using the RRC connection reconfiguration message. Thus, with the EN-DC as well, the PDCP entity suitable for the application service used by the UE can be established, and communication can be efficiently performed with reduced complexity of protocol processing.

Embodiment 3

In Embodiment 3 of the present invention, a DRB configuration including an SDAP entity configuration in a case that the core network is the 5GC 110 will be described. In Embodiment 3, the UE 122 may communicate with the 5GC 110 via the gNB, may communicate with the 5GC via the eNB, or may communicate with the 5GC using the MR-DC in which both of the gNB and the eNB are used.

The Embodiment 3 will be described with reference to FIGS. 1, 5, 7, and 8, and FIGS. 13 to 15, FIGS. 16, 17, and 18.

Figure 13:
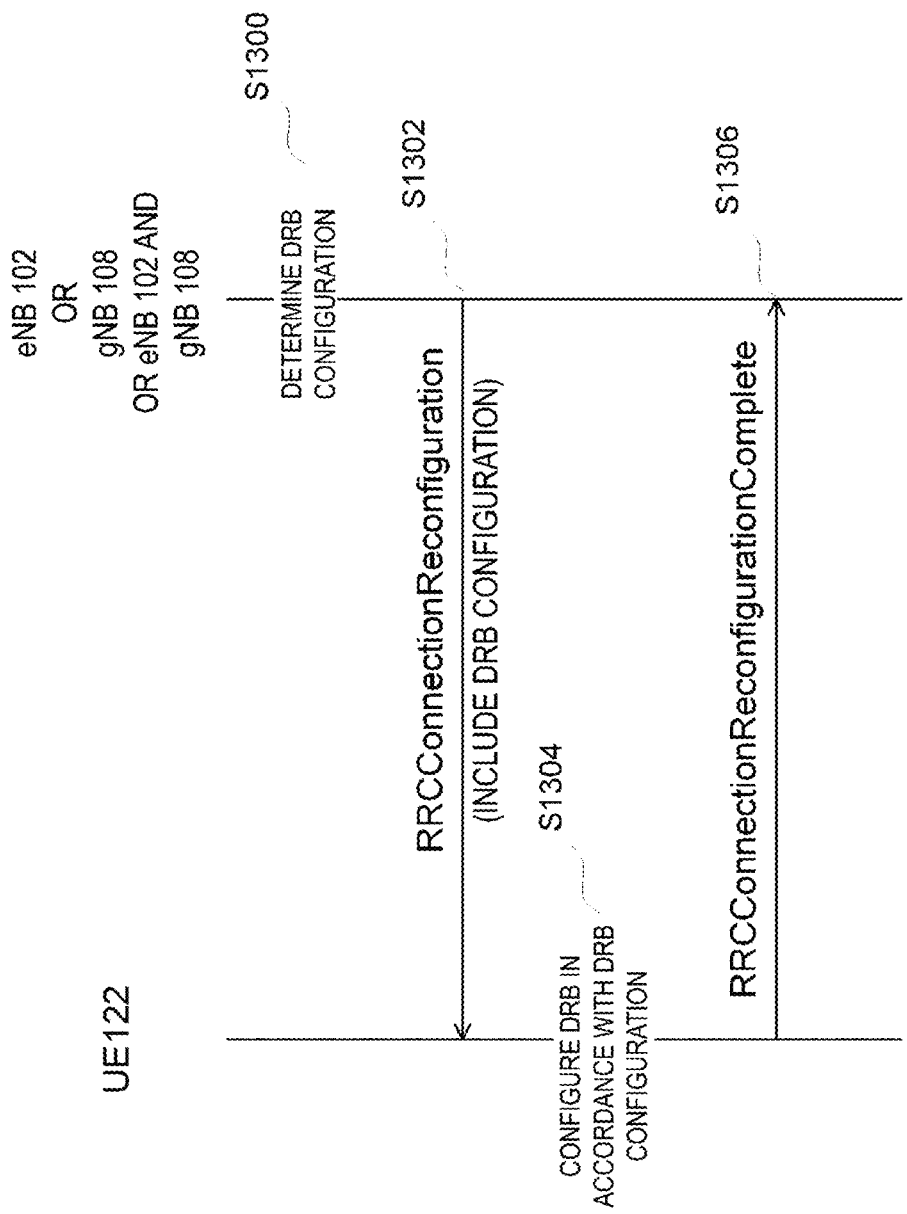
FIG. 13 is a diagram illustrating an example of the DRB configuration reception and configuration according to Embodiment 3 of the present invention.

FIG. 13 is a drawing illustrating an example of DRB configuration reception and configuration according to the embodiment of the present invention. Either the eNB 102 or the gNB 108 or both the eNB 102 and the gNB 108 determine the DRB configuration including the SDAP entity configuration requested to the UE 122 (S1300). Either the eNB 102 or the gNB 108 or both the eNB 102 and the gNB 108 may determine the DRB configuration based on information from the core network (either the EPC 104 or the 5GC 110, or both the EPC 104 and the 5GC 110) or capability of the UE 122, or the information from the core network and the capability of the UE 122. Note that the information from the core network may be determined based on a condition of an application service, such as a voice call, requested by the UE 122. The DRB configuration may include information on the SDAP, such as an SDAP header length. The information on the SDAP may be included in the SDAP entity configuration, or may be included in another entity configuration, such as the PDCP entity configuration. Next, either the eNB 102 or the gNB 108 or both the eNB 102 and the gNB 108 generate an RRC connection reconfiguration request (RRCConnectionReconfiguration) message including the DRB configuration and transmit the message to the UE 122 (S1302). The receiver 500 of the UE 122 receives the RRC connection reconfiguration request message including the DRB configuration and transfers the DRB configuration to the configuration unit 502.

FIGS. 14 and 15 are examples of Abstract Syntax Notation One (ASN.1) for the DRB configuration including the SDAP information according to the embodiment of the present invention. In the examples of ASN.1 in FIGS. 14 and 15, <omitted> and <partly omitted> are not part of the description of ASN.1, but indicate that other pieces of information are omitted. Note that information may be omitted in a part where <omitted> or <partly omitted> is not indicated.

FIG. 14 is an example in which the SDCP entity configuration includes SDCP header length information, and FIG. 15 is an example in which another PDCP entity configuration includes a SDCP header length. The SDCP header length information may be information included in either the SDCP entity configuration or the PDCP entity configuration, or may be information included in both the SDCP entity configuration and the PDCP entity configuration. The SDAP header length may be a length of a multiple of eight including zero (0). For example, in the examples of FIGS. 14 and 15, "len0bits," "len8bits," "len16bits," and "len24bits" may be 0 bits, 8 bits, 12 bits, and 24 bits, respectively. Alternatively, it may be indicated in units of byte such as "len0bytes," "len1bytes," "len2 bytes," and "len3 bytes," or in units of octet. Note that the length of the SDAP header being zero may mean that no SDAP header is present. Additionally, an indication and a designation of the SDAP header length are not limited to thereto, and another notation and designation may be possible. A message designation, IE designation, parameter designation, and the like of ASN.1 in FIGS. 14 and 15 are examples and other designations may be possible. The example of ASN.1 illustrated in FIGS. 14 and 15 may be a part of the example of ASN.1 illustrated in FIGS. 7 and 8, or FIGS. 16, 17, and 18.

The configuration unit 502 of the UE 122 will be described using the example of FIG. 14, that is, an example in a case that the SDAP entity configuration includes the SDAP header length. In S1304 of FIG. 13, the DRB configuration that the receiver 500 of the UE 122 transfers to the configuration unit 502 of the UE 122 includes at least the DRB identity and the SDAP entity configuration corresponding to the DRB identity, and the SDAP entity configuration includes the SDAP header length. The configuration unit 502 of the UE 122 establishes or reestablishes the SDAP entity in accordance with the DRB identity and the SDAP entity configuration corresponding to the DRB identity. In other words, in a case that a value of the DRB identity transferred from the receiver 500 is not present in the current configuration of the terminal apparatus, the SDAP entity may be established. In a case that the value of the DRB identity transferred from the receiver 500 is present in the current configuration of the terminal apparatus, the SDAP entity may be reestablished. Note that, in a case of the length of the SDAP header being zero, a process of establishing the SDAP entity but not admitting the presence of the SDAP header may be performed, or a process of not establishing the SDAP entity may be performed.

The configuration unit 502 of the UE 122 will be described using the example of FIG. 15, that is, an example in a case that the PDCP entity configuration includes the SDAP header length. In S1304 of FIG. 13, the DRB configuration that the receiver 500 of the UE 122 transferred to the configuration unit 502 of the UE 122 includes at least the DRB identity and the PDCP entity configuration corresponding to the DRB identity, and the PDCP entity configuration includes the SDAP header length. The configuration unit 502 of the UE 122 establishes or reestablishes the PDCP entity in accordance with the DRB identity and the PDCP entity configuration corresponding to the DRB identity. In other words, in a case that the value of the DRB identity transferred from the receiver 500 is not present in the current configuration of the terminal apparatus, the PDCP entity may be established. In a case that the value of the DRB identity transferred from the receiver 500 is present in the current configuration of the terminal apparatus, the PDCP entity may be reestablished. The established or reestablished PDCP entity may identify an SDAP SDU, that is, a starting position of IP packets from the SDAP header length information, and perform header compression processing. Note that even in a case that the SDAP header length is not included in the PDCP entity configuration and included in the SDAP entity configuration, the PDCP entity may identify the SDAP SDU, that is, the starting position of IP packets, from the SDAP header length information included in the SDAP entity configuration and perform header compression processing.

In FIG. 13, after completing the configuration in the configuration unit 502 of the UE 122, the UE 122 transmits an RRC Connection Reconfiguration Complete (RRCConnectionReconfigurationComplete) message to either the eNB 102 or the gNB 108 or both the eNB 102 and the gNB 108 (S1306).

Note that the DRB configuration according to the present embodiment may be included in an RRC Connection Establishment procedure and an RRC Connection Reestablishment procedure, in addition to the RRC connection reconfiguration procedure. The reestablishment of the PDCP entity according to the present embodiment may include, for example, zero reset of a Hyper Frame Number (HFN), a change to an initial (Initialization and Refresh (IR)) mode of header compression, a change to a designated cryptographic algorithm and cryptographic key, and the like, which are described in NPL 5.

Note that the zero reset of the Hyper Frame Number (HFN), the change to the initial (Initialization and Refresh (IR)) mode of header compression, and the change to the designated cryptographic algorithm and cryptographic key, which are described in Non Patent Literature, are for E-UTRA, but may be applied for NR.

While the DRB configuration according to the present embodiment assumes a case that the core network is 5GC, the DRB configuration may also be applied to a case that the core network is EPC.

Thus, in the present embodiment, based on a condition of an application service, such as a voice call, requested by the terminal apparatus (UE) and the like, either the base station apparatus in the E-UTRA (eNB) or the base station apparatus in the NR (gNB), or the eNB and gNB perform the SDAP entity configuration including the SDAP header length or the PDCP entity configuration including the SDAP header length to be used in communication with the UE, and notify the UE of the configuration using the RRC connection reconfiguration message. Accordingly, the SDAP header length suitable for the application service used by the UE can be used, and header compression by the PDCP entity can be performed as needed, and communication can be efficiently performed with reduced complexity of protocol processing.

Note that while the notations regarding the RRC according to each embodiment of the present invention, for example, a message such as an RRC connection reconfiguration request message, ASN.1, and the like are provided on the assumption of the RRC for NR (for example, the RRC described in NPL 9 or NPL 10), they may be for LTE expansion, and may be transmitted and/or received between the base station apparatus for E-UTRA and the terminal apparatus supporting the MR-DC.

In addition, the reestablishment of each entity, such as the PDCP entity according to each embodiment of the present invention, may be performed by the RRC connection reconfiguration procedure at the time of handover. In addition, at the time of the reestablishment of each entity, such as the PDCP entity according to each embodiment of the present invention, security configuration may also be reconfigured.

A program operating on an apparatus according to the present invention may serve as a program that controls a Central Processing Unit (CPU) and the like to cause a computer to operate in such a manner as to achieve the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially achieved by a computer. In such a case, a program for achieving such control functions may be recorded on a computer-readable recording medium to cause a computer system to read the program recorded on the recording medium and to perform the program. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to achieve some of the functions described above, and additionally may be configured to achieve the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be configured of a digital circuit, or may be configured of an analog circuit. Furthermore, in a case that with advances in semiconductor technology, a circuit integration technology appears that replaces the present integrated circuits, it is also possible to use an integrated circuit based on the technology.

Supplement

A terminal apparatus according to a first aspect of the present invention is a terminal apparatus that supports EN-DC. The terminal apparatus includes a receiver configured to receive an RRC connection reconfiguration message from a base station apparatus. The RRC connection reconfiguration message includes a radio bearer identity. The terminal apparatus further includes a configuration unit configured to establish a PDCP entity in accordance with a PDCP entity configuration for NR in a case that the terminal apparatus has not configured a value of the radio bearer identity and in a case that the RRC connection reconfiguration message includes the PDCP entity configuration for NR.

A terminal apparatus according to a second aspect of the present invention is a terminal apparatus that supports EN-DC. The terminal apparatus includes a receiver configured to receive an RRC connection reconfiguration message from a base station apparatus. The RRC connection reconfiguration message includes a radio bearer identity and a PDCP entity configuration corresponding to the radio bearer identity. The PDCP entity configuration is either the PDCP entity configuration for E-UTRA or the PDCP entity configuration for NR. The terminal apparatus further includes a configuration unit configured to establish a PDCP entity in accordance with the PDCP entity configuration for NR in a case that the terminal apparatus has not configured a value of the radio bearer identity and in a case that the RRC connection reconfiguration message does not include the PDCP entity configuration for E-UTRA.

The terminal apparatus according to a third aspect of the present invention in the first or the second aspect may be a terminal apparatus in which the PDCP entity corresponds to an MCG bearer of the EN-DC.

A base station apparatus according to a fourth aspect of the present invention is a base station apparatus that supports EN-DC. The base station apparatus includes a generation unit configured to generate an RRC connection reconfiguration message and a transmitter configured to transmit the RRC connection reconfiguration message to a terminal apparatus. The RRC connection reconfiguration message includes a radio bearer identity. The RRC connection reconfiguration message including the radio bearer identity causes the terminal apparatus to establish a PDCP entity in accordance with a PDCP entity configuration for NR in a case that the terminal apparatus has not configured a value of the radio bearer identity and in a case that the RRC connection reconfiguration message includes the PDCP entity configuration for NR.

A base station apparatus according to a fifth aspect of the present invention is a base station apparatus that supports EN-DC. The base station apparatus includes a generation unit configured to generate an RRC connection reconfiguration message and a transmitter configured to transmit the RRC connection reconfiguration message to a terminal apparatus. The RRC connection reconfiguration message includes a radio bearer identity and a PDCP entity configuration corresponding to the radio bearer identity. The PDCP entity configuration is selected from the PDCP entity configuration for E-UTRA and the PDCP entity configuration for NR. The RRC connection reconfiguration message including the radio bearer identity and the PDCP entity configuration causes the terminal apparatus to establish a PDCP entity in accordance with the PDCP entity configuration for NR in a case that the terminal apparatus has not configured a value of the radio bearer identity and in a case that the RRC connection reconfiguration message does not include the PDCP entity configuration for E-UTRA.

The base station apparatus according to a sixth aspect of the present invention in the fourth or the fifth aspect may be a base station apparatus in which the PDCP entity corresponds to an MCG bearer of the EN-DC.

A method according to a seventh aspect of the present invention is a method performed by a terminal apparatus that supports EN-DC. The method includes the step of receiving an RRC connection reconfiguration message from a base station apparatus. The RRC connection reconfiguration message includes a radio bearer identity. A PDCP entity is established in accordance with a PDCP entity configuration for NR in a case that the terminal apparatus has not configured a value of the radio bearer identity and in a case that the RRC connection reconfiguration message includes the PDCP entity configuration for NR.

A method according to an eighth aspect of the present invention is a method performed by a terminal apparatus that supports EN-DC. The method includes the step of receiving an RRC connection reconfiguration message from a base station apparatus. The RRC connection reconfiguration message includes a radio bearer identity and a PDCP entity configuration corresponding to the radio bearer identity. The PDCP entity configuration is either the PDCP entity configuration for E-UTRA or the PDCP entity configuration for NR. A PDCP entity is established in accordance with the PDCP entity configuration for NR in a case that the terminal apparatus has not configured a value of the radio bearer identity and in a case that the RRC connection reconfiguration message does not include the PDCP entity configuration for E-UTRA.

The method according to a ninth aspect of the present invention in the seventh or the eighth aspect may be a method in which the PDCP entity corresponds to an MCG bearer of the EN-DC.

A method according to a tenth aspect of the present invention is a method performed by a base station apparatus that supports EN-DC. The method includes the steps of: generating an RRC connection reconfiguration message; and transmitting the RRC connection reconfiguration message to a terminal apparatus. The RRC connection reconfiguration message includes a radio bearer identity. The RRC connection reconfiguration message including the radio bearer identity causes the terminal apparatus to establish a PDCP entity in accordance with a PDCP entity configuration for NR in a case that the terminal apparatus has not configured a value of the radio bearer identity and in a case that the RRC connection reconfiguration message includes the PDCP entity configuration for NR.

A method according to an eleventh aspect of the present invention is a method performed by a base station apparatus that supports EN-DC. The method includes the steps of: generating an RRC connection reconfiguration message; and transmitting the RRC connection reconfiguration message to a terminal apparatus. The RRC connection reconfiguration message includes a radio bearer identity and a PDCP entity configuration corresponding to the radio bearer identity. The PDCP entity configuration is selected from the PDCP entity configuration for E-UTRA and the PDCP entity configuration for NR. The RRC connection reconfiguration message including the radio bearer identity and the PDCP entity configuration causes the terminal apparatus to establish a PDCP entity in accordance with the PDCP entity configuration for NR in a case that the terminal apparatus has not configured a value of the radio bearer identity and in a case that the RRC connection reconfiguration message does not include the PDCP entity configuration for E-UTRA.

The method according to a twelfth aspect of the present invention in the tenth or the eleventh aspect may be a method in which the PDCP entity corresponds to an MCG bearer of the EN-DC.

A terminal apparatus according to a thirteenth aspect of the present invention is a terminal apparatus for communicating with a base station apparatus. The terminal apparatus includes a receiver configured to receive an RRC connection reconfiguration request message including a Data Radio Bearer (DRB) configuration from the base station apparatus and a configuration unit configured to configure a DRB in accordance with the DRB configuration. The DRB configuration includes a DRB identity and a PDCP entity configuration corresponding to the DRB identity. A value of the DRB identity is absent in a current configuration of the terminal apparatus, and the PDCP entity configuration information includes one of the PDCP entity configuration for E-UTRA and the PDCP entity configuration for NR. A PDCP entity is established in accordance with the PDCP entity configuration information in a case that the PDCP entity configuration information includes information on the PDCP entity configuration for E-UTRA, and the PDCP entity is established in accordance with the PDCP entity configuration information in a case that the PDCP entity configuration information includes the PDCP entity configuration information for NR.

A terminal apparatus according to a fourteenth aspect of the present invention is a terminal apparatus for communicating with a base station apparatus. The terminal apparatus includes a receiver configured to receive an RRC connection reconfiguration request message including a Data Radio Bearer (DRB) configuration from the base station apparatus and a configuration unit configured to configure a DRB in accordance with the DRB configuration. The DRB configuration includes a DRB identity and a PDCP entity configuration corresponding to the DRB identity. A value of the DRB identity is present in a current configuration of the terminal apparatus, and the PDCP entity configuration information includes one of the PDCP entity configuration for E-UTRA and the PDCP entity configuration for NR. A PDCP entity is reestablished in accordance with the PDCP entity configuration information in a case that the PDCP entity configuration information includes information on the PDCP entity configuration for E-UTRA, and the PDCP entity is established in accordance with the PDCP entity configuration information in a case that the PDCP entity configuration information includes the PDCP entity configuration information for NR.

A terminal apparatus according to a fifteenth aspect of the present invention is a terminal apparatus that supports Multi Radio Access Technology Dual Connectivity (MR-DC) using Evolved Universal Terrestrial Radio Access (E-UTRA) and New Radio (NR). The terminal apparatus includes a receiver and a configuration unit. In a case that the E-UTRA is a master cell group, the receiver is configured to receive an RRC connection reconfiguration request message including a Data Radio Bearer (DRB) configuration of an anchor cell group from a master base station apparatus, and the configuration unit is configured to configure a DRB in accordance with the DRB configuration. The DRB configuration includes a DRB identity and a PDCP entity configuration corresponding to the DRB identity. A value of the DRB identity is absent in a current configuration of the terminal apparatus, and the PDCP entity configuration information includes one of the PDCP entity configuration for E-UTRA and the PDCP entity configuration for NR. A PDCP entity is established in accordance with the PDCP entity configuration information in a case that the PDCP entity configuration information includes information on the PDCP entity configuration for E-UTRA, and the PDCP entity is established in accordance with the PDCP entity configuration information in a case that the PDCP entity configuration information includes the PDCP entity configuration information for NR.

A terminal apparatus according to a sixteenth aspect of the present invention is a terminal apparatus that supports Multi Radio Access Technology Dual Connectivity (MR-DC) using an Evolved Universal Terrestrial Radio Access (E-UTRA) and a New Radio (NR). The terminal apparatus includes a receiver and a configuration unit. In a case that the E-UTRA is a master cell group, the receiver is configured to receive an RRC connection reconfiguration request message including a Data Radio Bearer (DRB) configuration of an anchor cell group from a master base station apparatus, and the configuration unit is configured to configure a DRB in accordance with the DRB configuration. The DRB configuration includes a DRB identity and a PDCP entity configuration corresponding to the DRB identity. A value of the DRB identity is present in a current configuration of the terminal apparatus, and the PDCP entity configuration information includes one of the PDCP entity configuration for E-UTRA and the PDCP entity configuration for NR. A PDCP entity is reestablished in accordance with the PDCP entity configuration information in a case that the PDCP entity configuration information includes information on the PDCP entity configuration for E-UTRA, and the PDCP entity is reestablished in accordance with the PDCP entity configuration information in a case that the PDCP entity configuration information includes the PDCP entity configuration information for NR.

The terminal apparatus according to a seventeenth aspect of the present invention in the fifteenth or the sixteenth aspect may be a terminal apparatus in which the anchor cell group is a master cell group.

The terminal apparatus according to an eighteenth aspect of the present invention in the fifteenth or the sixteenth aspect may be a terminal apparatus in which the anchor cell group is a secondary cell group.

A terminal apparatus according to a nineteenth aspect of the present invention is a terminal apparatus that supports Multi Radio Access Technology Dual Connectivity (MR-DC) using an Evolved Universal Terrestrial Radio Access (E-UTRA) and a New Radio (NR). The terminal apparatus includes a receiver and a configuration unit. In a case that the E-UTRA is a master cell group, the receiver is configured to receive an RRC connection reconfiguration request message including a Data Radio Bearer (DRB) configuration of an anchor cell group and a DRB configuration of an additional cell group from a master base station apparatus, and the configuration unit is configured to configure a DRB in accordance with the DRB configuration. The DRB configuration of the anchor cell group includes a DRB identity of the anchor cell group and a PDCP entity configuration corresponding to the DRB identity of the anchor cell group. The DRB configuration of the additional cell group includes the DRB identity of the anchor cell group and information of a DRB type being a split. A PDCP entity of the anchor cell group is reestablished in accordance with PDCP entity configuration information included in the DRB configuration of the anchor cell group corresponding to the DRB identity of the anchor cell group.

The terminal apparatus according to a twentieth aspect of the present invention in the nineteenth aspect may be a terminal apparatus in which the anchor cell group is a master cell group, and the additional cell group is a secondary cell group.

The terminal apparatus according to a twenty-first aspect of the present invention in the nineteenth aspect may be a terminal apparatus in which the anchor cell group is a secondary cell group, and the additional cell group is a master cell group.

The terminal apparatus according to a twenty-second aspect of the present invention in any of the thirteenth to the twenty-first aspects may be a terminal apparatus in which the PDCP entity configuration information includes information indicating a PDCP entity configuration including a PDCP sequence number length, and the PDCP sequence number length is one or more of integer values including 7.

A terminal apparatus according to a twenty-third aspect of the present invention is a terminal apparatus for communicating with a base station apparatus. The terminal apparatus includes a receiver configured to receive an RRC connection reconfiguration request message including a Data Radio Bearer (DRB) configuration from the base station apparatus, and the configuration unit configured to configure a DRB in accordance with the DRB configuration. The DRB configuration includes a DRB identity and a PDCP entity configuration corresponding to the DRB identity. A value of the DRB identity is absent in a current configuration of the terminal apparatus, and the PDCP entity configuration information includes one of the PDCP entity configuration for E-UTRA and the PDCP entity configuration for NR. A PDCP entity is established in accordance with the PDCP entity configuration information in a case that the PDCP entity configuration information includes information on the PDCP entity configuration for E-UTRA, and the PDCP entity is established in accordance with the PDCP entity configuration information in a case that the PDCP entity configuration information includes the PDCP entity configuration information for NR.

Additionally, a terminal apparatus according to a twenty-fourth aspect of the present invention is a terminal apparatus for communicating with a base station apparatus. The terminal apparatus includes a receiver configured to receive an RRC connection reconfiguration request message including a Data Radio Bearer (DRB) configuration from the base station apparatus, and the configuration unit configured to configure a DRB in accordance with the DRB configuration. The DRB configuration includes a DRB identity and a PDCP entity configuration corresponding to the DRB identity. A value of the DRB identity is present in a current configuration of the terminal apparatus, and the PDCP entity configuration information includes one of the PDCP entity configuration for E-UTRA and the PDCP entity configuration for NR. A PDCP entity is reestablished in accordance with the PDCP entity configuration information in a case that the PDCP entity configuration information includes information on the PDCP entity configuration for E-UTRA, and the PDCP entity is established in accordance with the PDCP entity configuration information in a case that the PDCP entity configuration information includes the PDCP entity configuration information for NR.

Additionally, a terminal apparatus according to a twenty-fifth aspect of the present invention is a terminal apparatus that supports Multi Radio Access Technology Dual Connectivity (MR-DC) using Evolved Universal Terrestrial Radio Access (E-UTRA) and New Radio (NR). The terminal apparatus includes a receiver and a configuration unit. In a case that the E-UTRA is a master cell group, the receiver is configured to receive an RRC connection reconfiguration request message including a Data Radio Bearer (DRB) configuration of an anchor cell group from a master base station apparatus, and the configuration unit is configured to configure a DRB in accordance with the DRB configuration. The DRB configuration includes a DRB identity and a PDCP entity configuration corresponding to the DRB identity. A value of the DRB identity is absent in a current configuration of the terminal apparatus, and the PDCP entity configuration information includes one of the PDCP entity configuration for E-UTRA and the PDCP entity configuration for NR. A PDCP entity is established in accordance with the PDCP entity configuration information in a case that the PDCP entity configuration information includes information on the PDCP entity configuration for E-UTRA, and the PDCP entity is established in accordance with the PDCP entity configuration information in a case that the PDCP entity configuration information includes the PDCP entity configuration information for NR.

Additionally, a terminal apparatus according to a twenty-sixth aspect of the present invention is a terminal apparatus that supports Multi Radio Access Technology Dual Connectivity (MR-DC) using Evolved Universal Terrestrial Radio Access (E-UTRA) and New Radio (NR). The terminal apparatus includes a receiver and a configuration unit. In a case that the E-UTRA is a master cell group, the receiver is configured to receive an RRC connection reconfiguration request message including a Data Radio Bearer (DRB) configuration of an anchor cell group from a master base station apparatus, and the configuration unit is configured to configure a DRB in accordance with the DRB configuration. The DRB configuration includes a DRB identity and a PDCP entity configuration corresponding to the DRB identity. A value of the DRB identity is present in a current configuration of the terminal apparatus, and the PDCP entity configuration information includes one of the PDCP entity configuration for E-UTRA and the PDCP entity configuration for NR. A PDCP entity is reestablished in accordance with the PDCP entity configuration information in a case that the PDCP entity configuration information includes information on the PDCP entity configuration for E-UTRA, and the PDCP entity is reestablished in accordance with the PDCP entity configuration information in a case that the PDCP entity configuration information includes the PDCP entity configuration information for NR.

Additionally, a terminal apparatus according to a twenty-seventh aspect of the present invention is a terminal apparatus that supports Multi Radio Access Technology Dual Connectivity (MR-DC) using an Evolved Universal Terrestrial Radio Access (E-UTRA) and a New Radio (NR). The terminal apparatus includes a receiver and a configuration unit. In a case that the E-UTRA is a master cell group, the receiver is configured to receive an RRC connection reconfiguration request message including a Data Radio Bearer (DRB) configuration of an anchor cell group and a DRB configuration of an additional cell group from a master base station apparatus, and the configuration unit is configured to configure a DRB in accordance with the DRB configuration. The DRB configuration of the anchor cell group includes a DRB identity of the anchor cell group and a PDCP entity configuration corresponding to the DRB identity of the anchor cell group. The DRB configuration of the additional cell group includes the DRB identity of the anchor cell group and information of a DRB type being a split. A PDCP entity of the anchor cell group is reestablished in accordance with PDCP entity configuration information included in the DRB configuration of the anchor cell group corresponding to the DRB identity of the anchor cell group.

A terminal apparatus according to a twenty-eighth aspect of the present invention is a terminal apparatus for communicating with a base station apparatus. The terminal apparatus includes a receiver configured to receive an RRC connection reconfiguration request message including a Data Radio Bearer (DRB) configuration from the base station apparatus, and a configuration unit configured to configure a DRB in accordance with the DRB configuration. The DRB configuration includes a DRB identity and an SDAP entity configuration corresponding to the DRB identity. A value of the DRB identity is absent in a current configuration of the terminal apparatus. The SDAP entity configuration includes an SDAP header length. The SDAP header length is one or more of integer values of a multiple of eight including zero. An SDAP entity is established in accordance with the SDAP configuration information.

A terminal apparatus according to a twenty-ninth aspect of the present invention is a terminal apparatus for communicating with a base station apparatus. The terminal apparatus includes a receiver configured to receive an RRC connection reconfiguration request message including a Data Radio Bearer (DRB) configuration from the base station apparatus, and a configuration unit configured to configure a DRB in accordance with the DRB configuration. The DRB configuration includes a DRB identity and an SDAP entity configuration corresponding to the DRB identity. A value of the DRB identity is present in a current configuration of the terminal apparatus. The SDAP entity configuration includes an SDAP header length. The SDAP header length is one or more of integer values of a multiple of eight including zero. An SDAP entity is reestablished in accordance with the SDAP configuration information.

These comprehensive or specific aspects may be achieved in a system, apparatus, method, integrated circuit, computer program, or recording medium, or may be achieved in any combination of systems, apparatuses, methods, integrated circuits, computer programs, and recording media.

Note that the present invention of the present patent application is not limited to the above-described embodiments. In the embodiment, apparatuses have been described as an example, but the present invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application claims the benefit of priority to JP 2017-117492 filed on Jun. 15, 2017, which is incorporated herein by reference in its entirety.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
500 Receiver
502 Configuration unit

The invention claimed is:

1. A terminal apparatus that supports Evolved Universal Terrestrial Radio Access New Radio Dual Connectivity, comprising:
reception circuitry configured to receive a Radio Resource Control connection reconfiguration message from a base station apparatus, the Radio Resource Control connection reconfiguration message including a radio bearer identity; and
configuration circuitry configured to establish a Packet Data Convergence Protocol entity for New Radio in accordance with a Packet Data Convergence Protocol entity configuration for New Radio, in a case that (a) the radio bearer identity is not a part of a current configuration of the terminal apparatus and (b) the Radio Resource Control connection reconfiguration message includes the Packet Data Convergence Protocol entity configuration for New Radio, wherein
the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

2. A terminal apparatus that supports Evolved Universal Terrestrial Radio Access New Radio Dual Connectivity, comprising:
reception circuitry configured to receive a Radio Resource Control connection reconfiguration message from a base station apparatus, the Radio Resource Control connection reconfiguration message including a radio bearer identity and a Packet Data Convergence Protocol entity configuration corresponding to the radio bearer identity; and configuration circuitry configured to determine whether the received Packet Data Convergence Protocol entity configuration is a Packet Data Convergence Protocol entity configuration for Evolved Universal Terrestrial Radio Access or a Packet Data Convergence Protocol entity configuration for New Radio, wherein the configuration circuitry is configured to establish a Packet Data Convergence Protocol entity for New Radio in accordance with the Packet Data Convergence Protocol entity configuration for New Radio, in a case that (a) the radio bearer identity is not a part of a current configuration of the terminal apparatus and (b) the Radio Resource Control connection reconfiguration message does not include the Packet Data Convergence Protocol entity configuration for Evolved Universal Terrestrial Radio Access, and the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

3. A base station apparatus that supports Evolved Universal Terrestrial Radio Access New Radio Dual Connectivity, comprising:

generation circuitry configured to generate a Radio Resource Control connection reconfiguration message; and transmission circuitry configured to transmit the Radio Resource Control connection reconfiguration message to a terminal apparatus, wherein the Radio Resource Control connection reconfiguration message includes a radio bearer identity, the Radio Resource Control connection reconfiguration message including the radio bearer identity causes the terminal apparatus to establish a Packet Data Convergence Protocol entity for New Radio in accordance with a Packet Data Convergence Protocol entity configuration for New Radio, in a case that (a) the radio bearer identity is not a part of a current configuration of the terminal apparatus and (b) the Radio Resource Control connection reconfiguration message includes the Packet Data Convergence Protocol entity configuration for New Radio, and the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

4. A base station apparatus that supports Evolved Universal Terrestrial Radio Access New Radio Dual Connectivity, comprising:

generation circuitry configured to generate a Radio Resource Control connection reconfiguration message; and transmission circuitry configured to transmit the Radio Resource Control connection reconfiguration message to a terminal apparatus, wherein the Radio Resource Control connection reconfiguration message includes a radio bearer identity and a Packet Data Convergence Protocol entity configuration corresponding to the radio bearer identity, the Packet Data Convergence Protocol entity configuration is selected from a Packet Data Convergence Protocol entity configuration for Evolved Universal Terrestrial Radio Access and a Packet Data Convergence Protocol entity configuration for New Radio, the Radio Resource Control connection reconfiguration message including the radio bearer identity and the Packet Data Convergence Protocol entity configuration causes the terminal apparatus to establish a Packet Data Convergence Protocol entity for New Radio in accordance with the Packet Data Convergence Protocol entity configuration for New Radio, in a case that (a) the radio bearer identity is not a part of a current configuration of the terminal apparatus and (b) the Radio Resource Control connection reconfiguration message does not include the Packet Data Convergence Protocol entity configuration for Evolved Universal Terrestrial Radio Access, and the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

5. A method performed by a terminal apparatus that supports Evolved Universal Terrestrial Radio Access New Radio Dual Connectivity, the method comprising the steps of:

receiving a Radio Resource Control connection reconfiguration message from a base station apparatus, the Radio Resource Control connection reconfiguration message including a radio bearer identity; and establishing a Packet Data Convergence Protocol entity for New Radio in accordance with a Packet Data Convergence Protocol entity configuration for New Radio, in a case that (a) the radio bearer identity is not a part of a current configuration of the terminal apparatus and (b) the Radio Resource Control connection reconfiguration message includes the Packet Data Convergence Protocol entity configuration for New Radio, wherein the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

6. A method performed by a terminal apparatus that supports Evolved Universal Terrestrial Radio Access New Radio Dual Connectivity, the method comprising the steps of:

receiving a Radio Resource Control connection reconfiguration message from a base station apparatus, wherein the Radio Resource Control connection reconfiguration message includes a radio bearer identity and a Packet Data Convergence Protocol entity configuration corresponding to the radio bearer identity;

determining whether the received Packet Data Convergence Protocol entity configuration is a Packet Data Convergence Protocol entity configuration for Evolved Universal Terrestrial Radio Access or a Packet Data Convergence Protocol entity configuration for New Radio; and establishing a Packet Data Convergence Protocol entity for New Radio in accordance with the Packet Data Convergence Protocol entity configuration for New Radio, in a case that (a) the radio bearer identity is not a part of a current configuration of the terminal apparatus and (b) the Radio Resource Control connection reconfiguration message does not include the Packet Data Convergence Protocol entity configuration for Evolved Universal Terrestrial Radio Access, wherein the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

7. A method performed by a base station apparatus that supports Evolved Universal Terrestrial Radio Access New Radio Dual Connectivity, the method comprising the steps of:

generating a Radio Resource Control connection reconfiguration message; and transmitting the Radio Resource Control connection reconfiguration message to a terminal apparatus, wherein the Radio Resource Control connection reconfiguration message includes a radio bearer identity, the Radio Resource Control connection reconfiguration message including the radio bearer identity causes the terminal apparatus to establish a Packet Data Convergence Protocol entity for New Radio in accordance with a Packet Data Convergence Protocol entity configuration for New Radio, in a case that (a) the radio bearer identity is not a part of a current configuration of the terminal apparatus and (b) the Radio Resource Control connection reconfiguration message includes the Packet Data Convergence Protocol entity configuration for New Radio, and the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

8. A method performed by a base station apparatus that supports Evolved Universal Terrestrial Radio Access New Radio Dual Connectivity, the method comprising the steps of:

generating a Radio Resource Control connection reconfiguration message; and transmitting the Radio Resource Control connection reconfiguration message to a terminal apparatus, wherein the Radio Resource Control connection reconfiguration message includes a radio bearer identity and a Packet Data Convergence Protocol entity configuration corresponding to the radio bearer identity, the Packet Data Convergence Protocol entity configuration is selected from a Packet Data Convergence Protocol entity configuration for Evolved Universal Terrestrial Radio Access and a Packet Data Convergence Protocol entity configuration for New Radio, the Radio Resource Control connection reconfiguration message including the radio bearer identity and the Packet Data Convergence Protocol entity configuration causes the terminal apparatus to establish a Packet Data Convergence Protocol entity for New Radio in accordance with the Packet Data Convergence Protocol entity configuration for New Radio, in a case that (a) the radio bearer identity is not a part of a current configuration of the terminal apparatus and in (b) the Radio Resource Control connection reconfiguration message does not include the Packet Data Convergence Protocol entity configuration for Evolved Universal Terrestrial Radio Access, and the Packet Data Convergence Protocol entity, which is established in accordance with the Packet Data Convergence Protocol entity configuration for New Radio, corresponds to a Master Cell Group bearer for the Evolved Universal Terrestrial Radio Access New Radio Dual Connectivity.

* * * * *